US006285868B1

(12) United States Patent
LaDue

(10) Patent No.: US 6,285,868 B1
(45) Date of Patent: *Sep. 4, 2001

(54) WIRELESS COMMUNICATIONS APPLICATION SPECIFIC ENABLING METHOD AND APPARATUS

(75) Inventor: Christoph Karl LaDue, Soquel, CA (US)

(73) Assignee: Aeris Communications, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/778,150

(22) Filed: Jan. 10, 1997

Related U.S. Application Data

(63) Continuation of application No. 08/624,111, filed on Apr. 3, 1996, now Pat. No. 5,594,740, which is a continuation of application No. 08/250,665, filed on May 27, 1994, now abandoned, which is a continuation-in-part of application No. 08/112,476, filed on Aug. 27, 1993, now abandoned.

(51) Int. Cl.[7] .............................. H04J 03/12; H04Q 07/00
(52) U.S. Cl. ..................... 455/410; 455/466; 455/517; 455/422; 340/870.02
(58) Field of Search .................................. 370/264, 524, 370/398; 379/59, 60; 455/412, 410, 466, 517, 511, 422, 419, 403; 340/988, 989, 992, 425.5, 431, 445, 447, 870.02

(56) References Cited

U.S. PATENT DOCUMENTS

| H610 | 3/1989 | Focarile et al. . |
| Re. 34,496 | 1/1994 | Franklin et al. . |
| 3,937,892 | 2/1976 | Bloch et al. . |

(List continued on next page.)

FOREIGN PATENT DOCUMENTS

WO 95/24791   9/1995   (WO) .

OTHER PUBLICATIONS

J. Sarnecki, "Microcell Design Principles," IEEE Communications Magazine, Apr. 1993, pp. 76–82.

J. Stewart, "Vehicle Location and Position Monitoring System Using Satellite Navigation and Cellular Telephone," IEEE Colloquium on Vehicle Location and Fleet Management, Jun. 8, 1993, pp. 7/1–5.

Primary Examiner—Ajit Patel
(74) Attorney, Agent, or Firm—Blakely Sokoloff Taylor & Zafman, LLP

(57) ABSTRACT

A method and apparatus for wireless communication on an existing wireless communication network comprising taking existing data and manipulating the data to create manipulated data. The manipulated data is then translated into an application specific message. The application specific message is applied to control and communicate with an application specific apparatus, whereby wireless communication on the existing wireless communication network is provided without causing any disruption, system overloading, or limitation on normal system communication activity.

18 Claims, 18 Drawing Sheets

U.S. PATENT DOCUMENTS

| | | |
|---|---|---|
| 5,255,306 | 10/1993 | Melton et al. . |
| 5,274,368 | 12/1993 | Breeden . |
| 5,276,728 | 1/1994 | Pagliaroli . |
| 5,280,426 | 1/1994 | Edmonds . |
| 5,295,178 | 3/1994 | Nickel et al. . |
| 5,307,509 | 4/1994 | Michalon et al. . |
| 5,325,419 | 6/1994 | Connolly et al. . |
| 5,327,478 | 7/1994 | Lebowitz . |
| 5,335,278 | 8/1994 | Matchett . |
| 5,337,345 | 8/1994 | Cassidy et al. . |
| 5,341,410 | 8/1994 | Aron et al. . |
| 5,343,493 | 8/1994 | Karimullah . |
| 5,355,511 | 10/1994 | Hatano et al. . |
| 5,357,254 | 10/1994 | Kah, Jr. . |
| 5,359,182 | 10/1994 | Schilling . |
| 5,365,516 | 11/1994 | Jandrell . |
| 5,377,193 | 12/1994 | Grube et al. . |
| 5,392,451 | 2/1995 | Schwendeman . |
| 5,396,539 | 3/1995 | Slekys et al. . |
| 5,396,653 | 3/1995 | Kivari et al. . |
| 5,400,018 | 3/1995 | Scholl et al. . |
| 5,404,355 | 4/1995 | Raith . |
| 5,410,737 | 4/1995 | Jones . |
| 5,420,911 | 5/1995 | Dahlin et al. . |
| 5,422,626 | 6/1995 | Fish . |
| 5,432,495 | 7/1995 | Tompkins . |
| 5,432,841 | 7/1995 | Rimer . |
| 5,446,759 | 8/1995 | Campana, Jr. . |
| 5,448,760 | 9/1995 | Frederick . |
| 5,448,773 | 9/1995 | McBurney et al. . |
| 5,465,387 | 11/1995 | Mukherjee . |
| 5,473,667 | 12/1995 | Neustein . |
| 5,483,465 | 1/1996 | Grube et al. . |
| 5,497,412 | 3/1996 | Lannen et al. . |
| 5,513,183 | 4/1996 | Kay et al. . |
| 5,525,967 | 6/1996 | Azizi et al. . |
| 5,525,969 | 6/1996 | Ladue . |
| 5,526,357 | 6/1996 | Jandrell . |
| 5,526,401 | 6/1996 | Roach, Jr. et al. . |
| 5,537,102 | 7/1996 | Pinnow . |
| 5,539,810 | 7/1996 | Kennedy, III et al. ................ 379/59 |
| 5,544,225 | 8/1996 | Kennedy, III et al. ................ 379/59 |
| 5,546,444 | 8/1996 | Roach, Jr. et al. . |
| 5,556,102 | 9/1996 | Haung . |
| 5,559,312 | 9/1996 | Lucero . |
| 5,563,931 | 10/1996 | Biship et al. . |
| 5,566,236 | 10/1996 | Melampy et al. . |
| 5,568,119 | 10/1996 | Schipper et al. . |
| 5,569,083 | 10/1996 | Fioretti . |
| 5,573,244 | 11/1996 | Mindes . |
| 5,593,535 | 1/1997 | Klotz . |
| 5,594,740 | 1/1997 | Ladue . |
| 5,610,969 | 3/1997 | McHenry et al. . |
| 5,611,730 | 3/1997 | Weiss . |
| 5,664,005 | 9/1997 | Emery et al. . |

\* cited by examiner

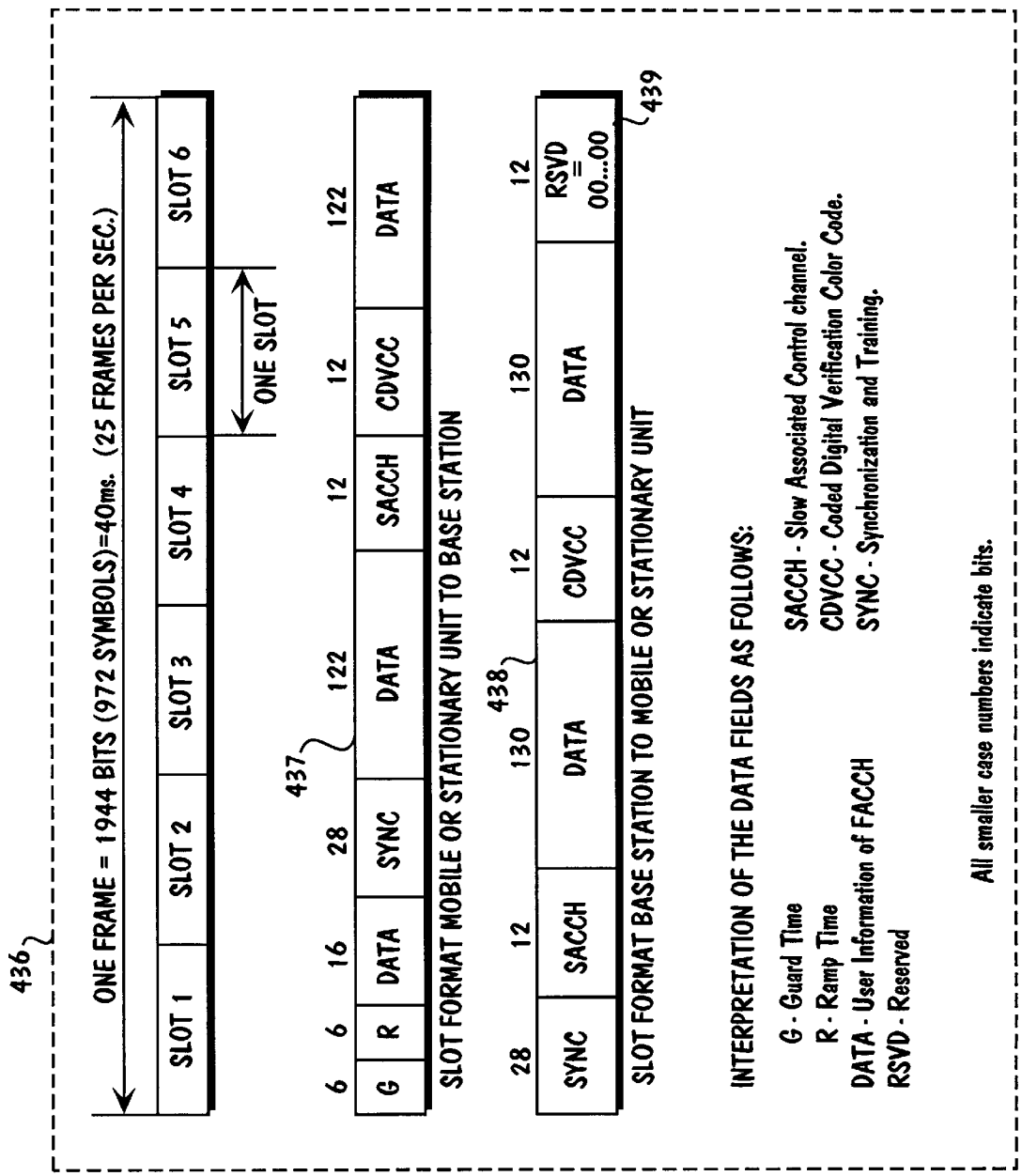

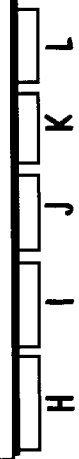

SLOT FORMAT USER STATUS DATA SENT TO BASE STATION.
1390018000650010012002300340045006700780081 23

H I J K L

SLOT FORMAT INSTRUCTION DATA TO MOBILE OR STATIONARY UNIT.
111123000650000760014000181000001000002300000 0120

M N O P Q R

STATUS RESPONSE     435

H = Longitude
I = Latitude
J = Velocity
K = Zone 1 PIR Normal
L = Zone 2 Level Sensor Normal

INSTRUCTION COMMANDS

M = Send Location Status
N = Send Security Status
O = Perform Location Update
P = Standby For Destination
Q = Longitude of Destination
R = Latitude of Destination

FIG. 6

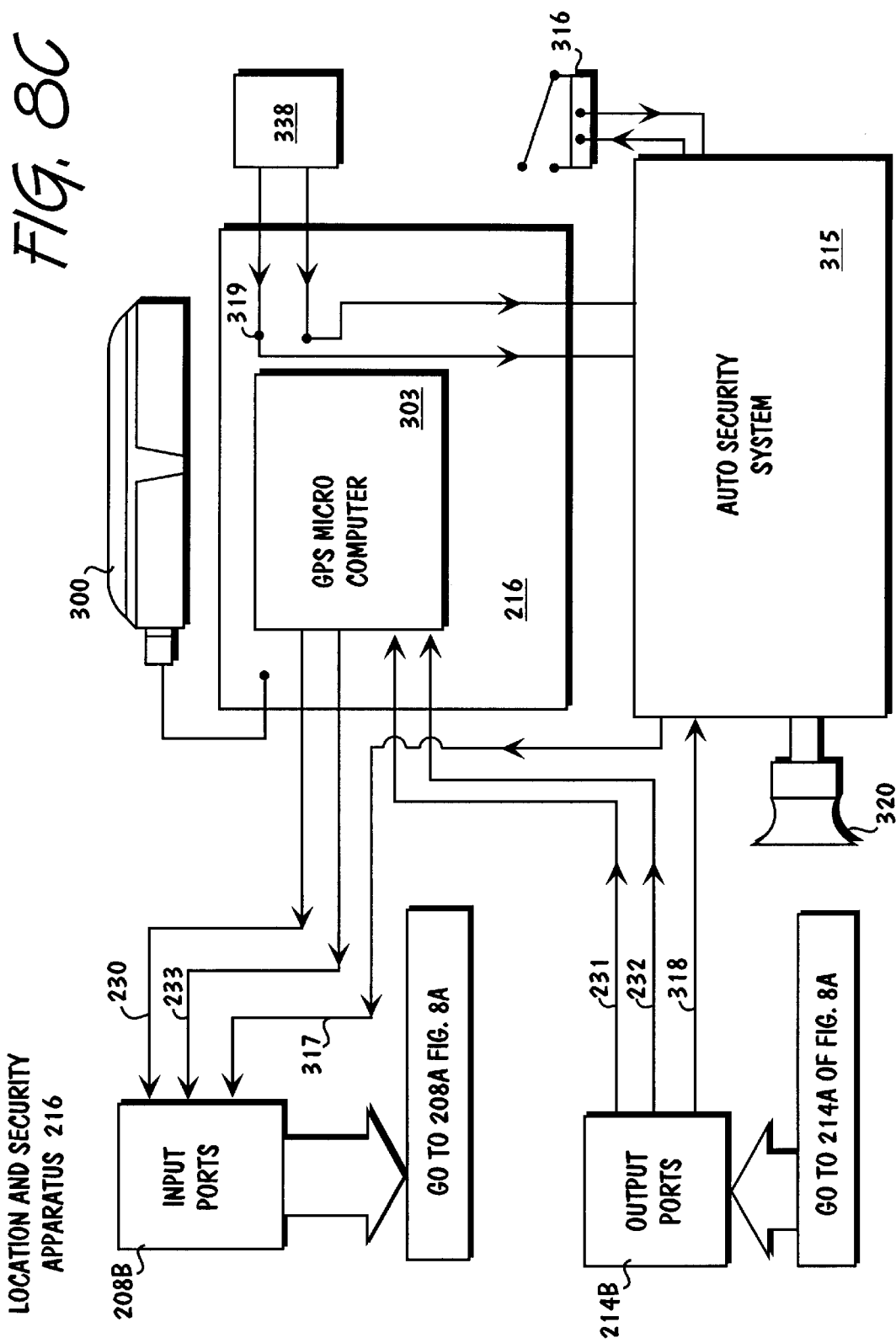

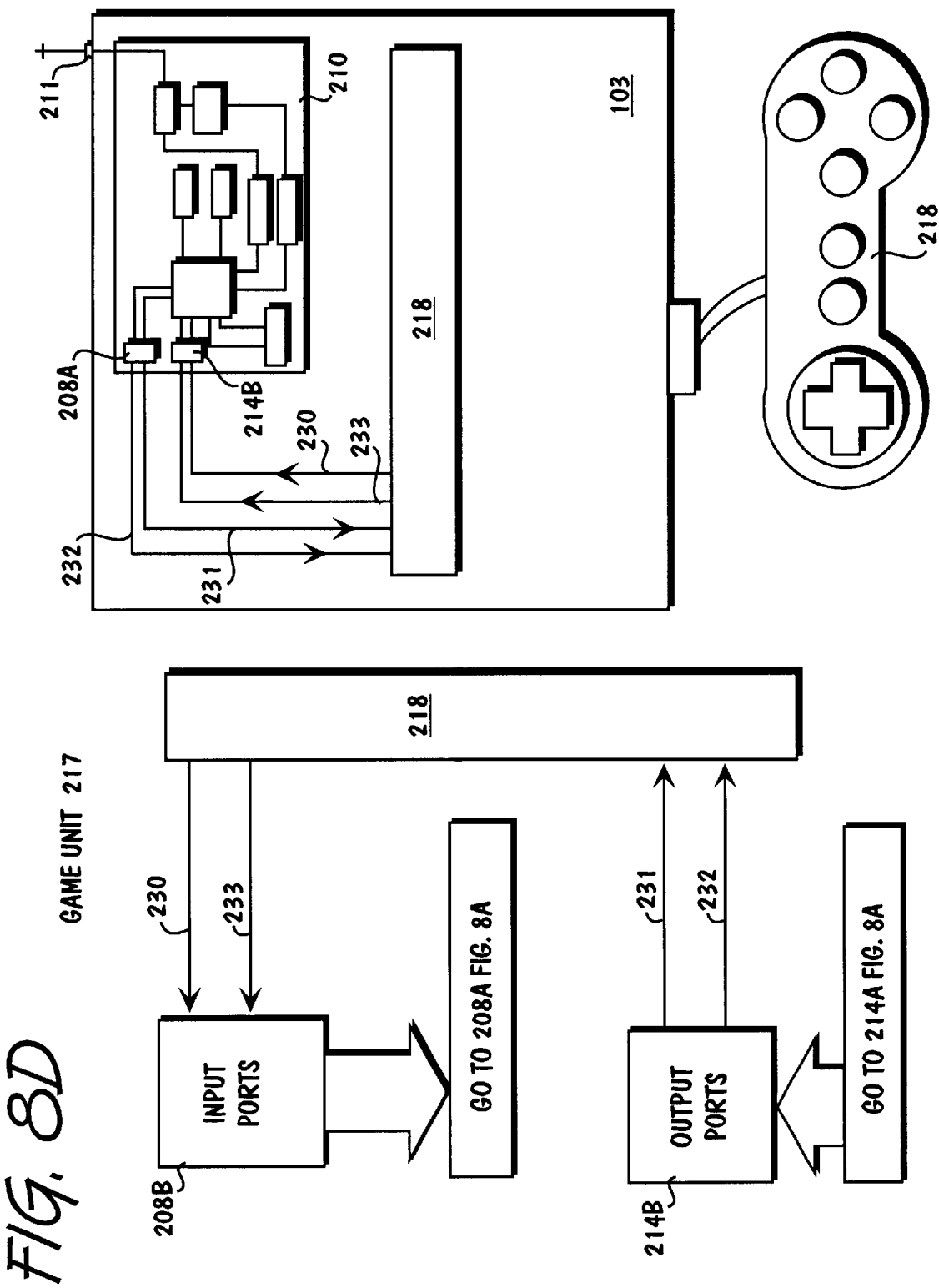

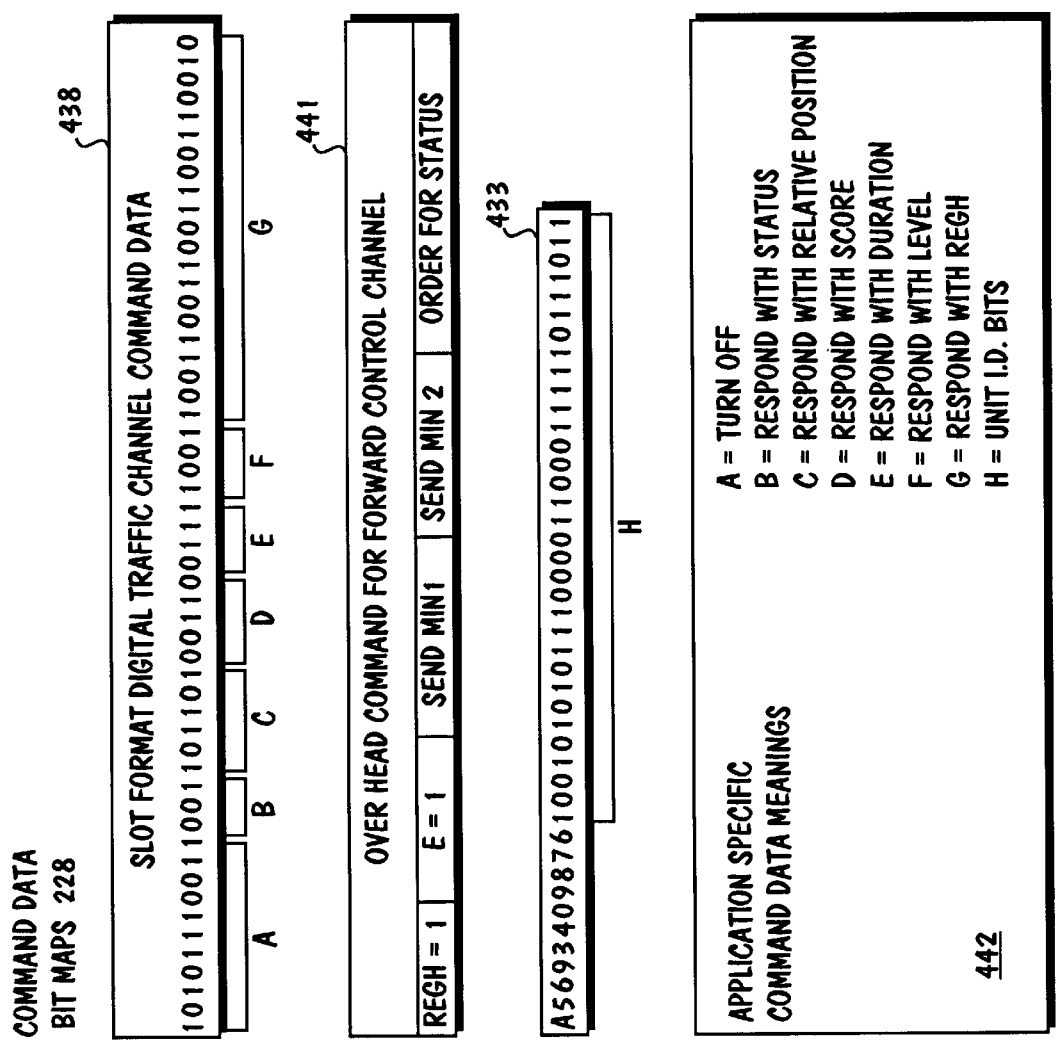

WIRELESS COMMUNICATIONS APPLICATION SPECIFIC ENABLING METHOD AND APPARATUS

The present application is a continuation of application Ser. No. 08/624,111, filed Apr. 3, 1996 now U.S. Pat. No. 5,594,740, which is a file wrapper continuation of application Ser. No. 08/250,665, filed May 27, 1994 now abandoned, which is a continuation in part of application Ser. No. 08/112,476, filed Aug. 27, 1993 now abandoned.

BACKGROUND OF THE INVENTION

1. Field of the Invention

The present invention relates to systems for transmitting and receiving two-way wireless data messages. More specifically, the invention relates to wireless communications systems including cellular telephone systems, mobile radio systems, and related technology such as Cellular Digital Packet Data (CDPD), Enhanced Specialized Mobile Radio (ESMR), Motorola Integrated Radio System (MIRS), Personal Communications Systems (PCS), satellite cellular hybrid systems, Mobile Radio (ESMR) dispatch services such as RAM Mobile Data, and ARDIS.

2. Description of Related Art

Systems and apparatuses have been proposed enabling wireless communication based on transmitted data rather than voice. Indeed, it has been suggested and speculated that we are in the midst of a revolution more realistically comparable in magnitude to personal computing than to cellular voice based communications. But much less clear is the path this revolution may take. The expressed commitment of virtually all major providers of wireless communications for business subscribers to expanding services in data messaging practically ensures that wireless data messaging will grow rapidly in coming years. But the very diversity of the proponents of wireless data messaging suggests an industry that will be fragmented at best, or choked by dissent and destructive competition at worst. The foremost cause of said dissent and fragmentation, is the lack of multi-system and inter system data communication protocol uniformity and standardization. Another major problem is the staggering cost of upgrading existing Cellular Mobile Telephone (CMT) and Enhanced Mobile Radio (ESMR), infrastructure. If system uniformity is accomplished, the result could produce a seamless, worldwide data communications network. The network envisioned could provide application specific services such as motor vehicle fleet management, motor vehicle anti-theft and recovery, shipping container tracking, railroad system management, personnel tracking and location, home arrest, public utility system management, highway call box add-on services, remote traffic signal control, security system status reporting, and a myriad of other application specific data communication services. Further, these application specific systems can be location based by integrating Global Positioning System receivers into the architecture of specially designed communication apparatus Other location systems could be utilized and integrated into apparatuses which are directly applicable to the present inventions operational scheme. Such location apparatuses can be read from control channels, and instructed to perform certain positioning and location reporting tasks. Such tasks would be received from and transmitted back to said control channels. Other application specific service apparatus can be non-location in design and operation and provide direct communication of status, and a non-location apparatus can be instructed to perform certain tasks, over the respective control channels in use that are used in a particular communications system.

The present system and apparatuses of the present invention provide a unique and simple solution to solving Cellular Mobile Telephone (CMT) and Enhanced Mobile Radio (ESMR) infrastructure upgrade and cellular inter system compatibility problems, in terms of technical, logistical and operational issues which are significantly limiting the non-voice wireless data communications industry at present. The present invention also provides an economical and technically efficient means of delivering heretofore mentioned application specific services to the Enhanced Specialized Mobile Radio (ESMR) Industry (NEXTELL), the Motorola Integrated Radio System (MIRS), and other related systems. In fact, the method and apparatuses of the present invention provide the technical and logistical means of providing application specific services to any communications standard which operates on wireless networks or which depend upon a centralized control model, or operations based on operates centralized subscriber specific authentication, registration, and inter system control data channel architecture. In fact the present invention provides, for the first time, a system and apparatus which utilize and exploit control channel communication pathways for the purpose of directly sending and receiving data messages, and which directly communicates by radio link an entire Cellular Mobile Telephone (CMT) or Enhanced Mobile Radio (ESMR) network for the purpose of commercially operating heretofore mentioned applications for specific services that are directly controlled and communicated with on control channels that do not require any voice channel operations.

In fact, with the system and apparatus of the present invention two way data transmission can be fully accomplished without any voice channel set up or access attempted. An entire one way and two way message communicative act can be accomplished during the initialization and idle mode, as well as sending data burst over Digital Traffic Channels that take nano seconds to initialize and complete. This method can be added to existing Cellular Mobile Telephone (CMT), Enhanced Mobile Radio (ESMR) and Mobile Satellite (MS) system radio sets and entire networks. Control channel pathways and communications protocols have, up to the present time, been limited to registration, authentication, anti-fraud, internal system management roaming processes, voice encryption and other related services, and in no way have been used to communicate application specific messaging directly to Cellular Mobile Telephone (CMT) and Enhanced Mobile Radio (ESMR) communicator apparatus, or to a communicator apparatus capable of sending application specific messages to control channels by direct radio link, without specialized modems. Such control channel data management presently involves many processes such as communicator apparatus control; which includes power control, voice quality control, and control and voice channel switching. Channel switching procedures are utilized for the purpose of maintaining the strongest signal on the strongest usable control channels, digital traffic channels and voice channels, as well as other related processes.

Accordingly, it is a primary purpose of the present invention to provide a system and apparatus for the manipulation, translation and encryption of control channel data bits such as Mobile Identification Numbers (MIN), which are the ten digit thirty two bit telephone directory numbers assigned to Cellular Mobile Telephone (CMT) and Enhanced Specialized Mobile Radio (ESMR) subscriber communication units. In addition, the present invention adds multi-bit application specific messaging to the control channels of said network systems. Additional control channel data bits the present invention manipulates, translates and encrypts are Shared Secret Data, A Key Data, RandSSD data, Electronic Serial Number Data, Filler Data, Reserved Format Data, Additional Data, Digital Traffic Channel User Data and a myriad of other control channel data now being utilized by Cellular Mobile Telephone (CMT) and Enhanced Mobile Radio (ESMR) for subscriber registration, authentication, and internal system management. Furthermore, the present invention does not require prohibitively expensive Cellular Mobile Telephone (CMT) and Enhanced Mobile Radio (ESMR) infrastructure upgrades, and radio component add ons for entire aforementioned networks.

The system and apparatus of present invention require no expensive subscriber specific end user equipment, nor require specialized modems and other cumbersome and expensive interface equipment. The present invention is fully digital, but, operates on existing analog cellular, enhanced specialized radio equipment, and satellite system apparatus. This feature of the present is important, simply because all data control channels in use in the world today are digital. These control channels are routinely called Forward Analog Control Channels, Reverse Control Channels, Digital traffic Channels, which include Fast Associated Control Channels, Slow Associated Control Channels, Forward Digital Traffic Channels, Reverse Digital Traffic Channels, Primary Paging Channels, Secondary Control Channels, Secondary Paging Channels. Other cellular system control channels such as Enhanced Specialized Mobile Radio (ESMR) control and Digital Traffic channels, Motorola Integrated Radio system control channels, and other cellular telephone and radio systems rely upon control channels for internal system control and management.

It is also a purpose of the present invention to provide a system and apparatus which does not interfere, or cause any disruption in control channel processes which manage normal voice communications. The present invention is essentially transparent, regardless of what type of communications network system it is applied too.

It is a still further purpose of the present invention to provide a system and apparatus which does not interfere or disrupt normal control channel operations which were originally designed to support and manage voice communication processes only, that is, any control channel functions which are designed to manage the voice communications aspect of Cellular Mobile Telephone (CMT) or Enhanced Mobile Radio (ESMR) Mobile Satellite (MS) are not effected by the present inventions operations. In other words, all normal voice based mobile subscriber stations operate unimpeded when the present invention is installed and applied to any given cellular telephone or radio network which relies upon a centralized control system as described.

There is further a great need in wireless communication technology for a low cost data communications system and apparatus that efficiently and economically enable application specific services and apparatuses to be installed and utilized worldwide. The present invention provides, at a very low cost, an improved wireless communications specific enabling system which overcomes the many shortcomings of prior systems.

Additional objects and advantages of the invention will be set forth in the description which follows, and in part will be obvious from the description, or may be learned by practice of the invention. The objects and advantages of the invention may be realized and obtained by means of the instrumentality's and combinations particularly pointed out in the appended claims.

SUMMARY OF THE INVENTION

To achieve the foregoing objects, and in accordance with the purposes of the invention as embodied and broadly described herein a method for wireless communication on existing wireless communication networks is provided, comprising: taking existing data and manipulating said existing data to create a manipulated data; translating said manipulated data into an application specific message; and applying said application specific message to control and communicate with an application specific apparatus, whereby wireless communication on said existing wireless communication network is provided without causing disruption,system overloading, or limitation on normal system communication.

The method for wireless communication is preferably transmitted through a plurality of control channels and digital traffic channels as direct communications pathways for direct control of application specific communication apparatuses and application specific control and management apparatus.

In accordance with the present invention, there is also provided an apparatus for direct wireless communication on an existing wireless communication networks, comprising: circuitry means for taking existing data and manipulating said existing data to create a manipulated data; means for translating said manipulated data into an application specific message; and means for applying said application specific message to control and communicate with an application specific apparatus, whereby wireless communication on said existing wireless communication network is provided without causing disruption, system overloading, or limitation on normal system communication activity.

Accordingly, the present invention provides a wireless communications application specific enabling (WCASES) technology, which provides an efficient and economical means for implementing such wireless data services in applications such as; motor vehicle fleet management, motor vehicle anti-theft locating and recovery, interactive game data management, cable television data communications, shipping container tracking, railroad system management, personnel tracking and locating, home arrest, public utility system management, highway call box ad-on services, remote traffic signal control, public utility system management, security system status reporting, and many other application specific data communications, and system command and control services. The term application specific relates to; applications which are data communication specific only, which relate to; Cellular Mobile Telephone (CMT), Enhanced Specialized Mobile Radio (ESMR), Satellite Cellular Hybrid (SCH) and Low Earth Orbit (LEO) systems called "brilliant pebbles systems", that can integrate and apply the present inventions method and apparatus, which will enable the communications systems to transmit messages to an apparatus which operates as a response to direct commands sent to the apparatus, and the apparatus will perform directed tasks as a response to the commands. The apparatus also sends data messages which relate to various parameters, conditions, and responses from systems and sensors, that the application specific apparatus is connected to or interfaced with. Preferably the control and direct communication activity will all occur on control channels and digital traffic channels that are integrated with Cellular Mobile Telephone (CMT), Enhanced Mobile Radio (ESMR) and Satellite Cellular Hybrid (SCH) systems, and Low Earth Orbit (LEO) "brilliant pebbles" systems which utilize control channels and digital traffic channels that are data specific only in terms of communications protocols, and the contents of the messages are contained within radio frequency carrier wave and wave form. The present invention does not interact in any way with channels and frequencies of the communication systems that act as voice communication specific pathways.

BRIEF DESCRIPTION OF THE DRAWINGS

The accompanying drawings, which are incorporated in and constitute a part of the specification, illustrate a preferred embodiment of the invention and, together with a general description given above and the detailed description of the preferred embodiments given below, serve to explain the principles of the invention.

FIG. 5 is a schematic diagram of a bit map illustrating the data space of the manipulated and translate data on a digital traffic channel, according to the invention.

FIG. 6 shows decoded data in a bit map flow chart representing binary data travelling in a digital traffic channel, according tot he invention.

FIG. 8C is a logic flow chart of an Application Specific Location and Security Apparatus for motor vehicles, according to the invention.

FIG. 8D is a logic flow chart of an Application Specific Video Game Unit, according to the present invention.

FIG. 11 is an illustration of Application Specific Command and instruction Data as it operates on a forward control channel and a foreword digital traffic channel, according to the invention.

DETAILED DESCRIPTION OF THE PREFERRED EMBODIMENTS OF THE INVENTION

Figure 1A:
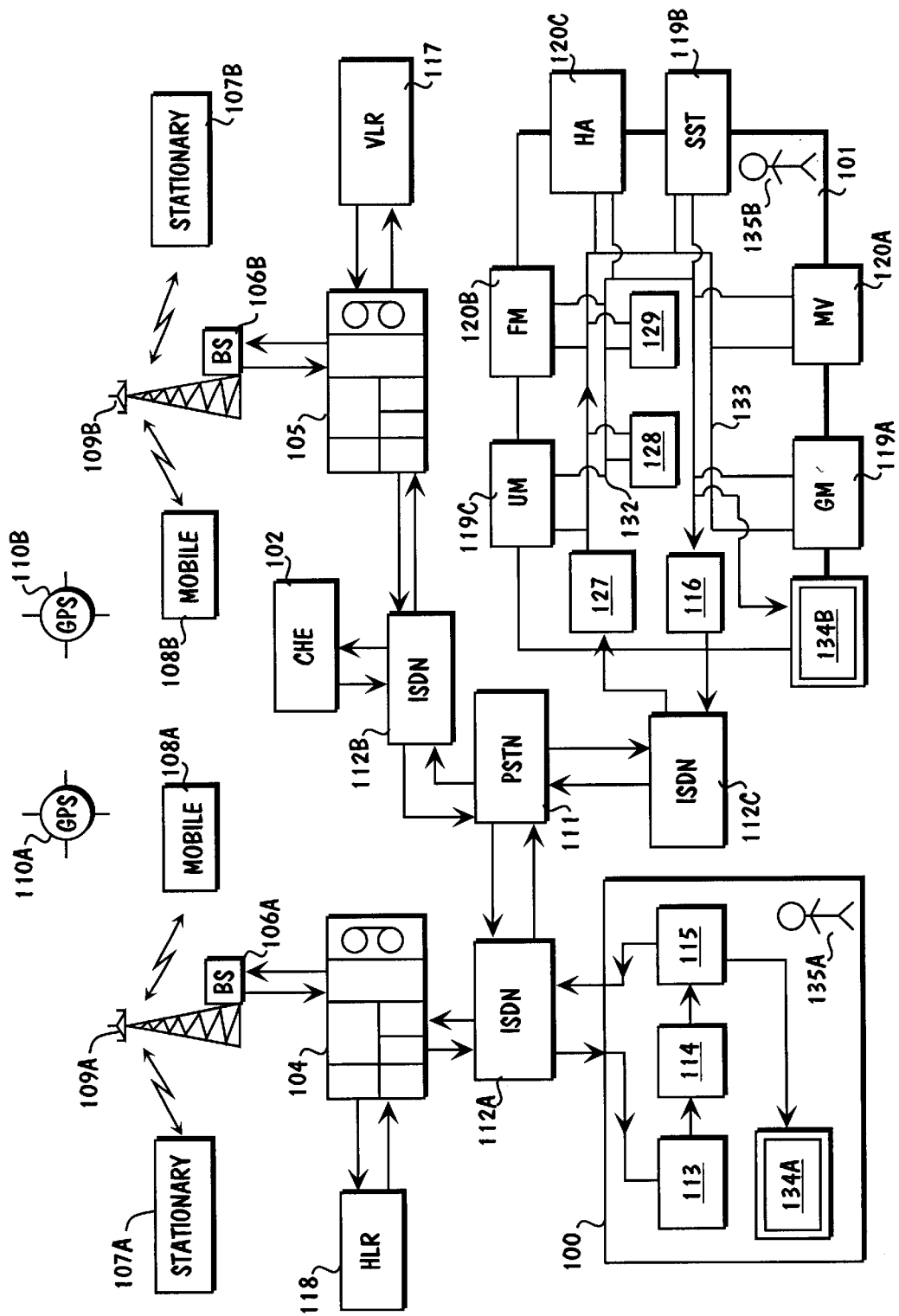
FIG. 1 is a block diagram of a preferred wireless communications specific enabling method, network, and apparatus according to the invention
FIG. 1B shows a block diagram of a preferred wireless communications specific enabling method, network, and apparatus, according to the invention.

Reference will now be made in detail to the present preferred embodiments of the invention as illustrated in the accompanying drawings. In describing the preferred embodiments and applications of the present invention, specific terminology is employed for the sake of clarity. However, the invention is not intended to be limited to the specific terminology so selected, and it is understood that each specific element includes all technical equivalents which operate in a similar manner to accomplish a similar purpose.

In accordance with the present invention, there is provide a method for wireless communication on existing wireless communication networks, comprising: taking existing data and manipulating said data to create a manipulated data; translating said manipulated data into an application specific message; and applying said application specific message to control and communicate with an application specific apparatus, whereby wireless communication on said existing wireless communication network is provided without causing disruption, system overloading, or limitation on normal system communication activity.

There is also provided, in accordance with the present invention, an apparatus for direct wireless communication on an existing wireless communication network, comprising: circuitry means for taking existing data and manipulating said existing data to create a manipulated data; means for translating said manipulated data into an application specific message; and means for applying said application specific message to control and communicate with an application specific apparatus, whereby wireless communication on said existing wireless communication network is provided without causing disruption, system overloading, or limitation on normal system communication activity thereby allowing data transmission without any interference or disruption with routine voice and related communications and control procedures of the wireless network.

In particular, the present inventions method, apparatus and communicating formats can be immediately implemented with existing Cellular Mobile Telephone (CMT) systems and Enhanced Mobile Radio (ESMR) systems. The general terminology that specify Cellular Mobile Telephone (CMT) and Enhanced Mobile Radio (ESMR), cover a wide range of mobile communications systems. The term Cellular Mobile Telephone (CMT) relates to communications system which are specifically designated as; Cellular Mobile Telephone (CMT) systems, Satellite Cellular Hybrid (SCH) systems, which are currently called Iridium Systems, Teledisc Systems and other mobile communication systems widely deemed cellular and satellite related. The term Enhanced Mobile Radio (ESMR) is a general term that relates to mobile communication system which are controlled by a centralized switching and communicating scheme specifically designated as; Enhanced Specialized Mobile Radio (ESMR) generically known as NEXTELL, Global Specialized Mobile (GSM), Personal Communications Systems (PCS), and Motorola Integrated Radio (MIRS).

The preferred method for wireless communication on existing wireless communication networks takes existing data and manipulates the data to create manipulated data. The data may be data providing readings of a remote monitoring device, for example, or data monitoring a game apparatus, traffic signal control apparatus, shipping container tracking apparatus, or the like. Preferably the manipulated data is transmitted through a plurality of control channels and digital traffic channels as a direct communication pathways for direct control of an application specific communications apparatus, or application specific control and management apparatus, such as those discussed above.

The present invention is applicable, adaptable, and operable with all analog and digital Cellular Mobile Telephone (CMT) systems, Enhanced Mobile Radio (ESMR) systems, and other wireless communications system that depend upon electronic operations commonly described as; centralized control, registration, authentication, anti-fraud, system management, intersystem communications, home location registers, and visitor location registers. These electronic process are important for system operational efficiency, flexibility, overall system security and user specific security. Such operational schemes traditionally include but are not limited to the following; electronic processes that perform registration routines, authentication routines, system control management, network to network communications, subscriber specific system to system roaming, anti-fraud procedures, and voice encryption. Other characteristics of aforementioned systems include; internal system maintenance and system performance analysis, base station to base station handoffs and handovers, home system to serving system handoffs and handovers, and other types electronic data control channel related communications.

The present invention operation and use provides for application specific service implementation in single Metropolitan Subscriber Areas (MSA), and Rural Subscriber Areas (RSA), which cover, various Geographical Service Areas (GSA). For example, a subscriber area is controlled by a Master Central Monitoring Station (MCMS), which controls certain Application Specific Central Monitoring Stations ASCMS. The MCMS, and the ASCMS can be physically located in close proximity to one another, or physically located apart in various remote locations. The MCMS and the ASCMS can be linked by a wide variety of communications pathways and protocols, which send digital electronic data signals at different bit rates or speeds.

The MSA, in the United States are traditionally served by two cellular service provides, which are designated A side and B side. Normally, the A side service is provided by non-wireline carriers, that is, a service provider whom has no affiliation with normal wireline telephone service providers. B side providers are normally affiliated with wireline providers. In many service areas the B side is owned and managed by a regional bell operating company, which operates land-line telephone services in that same geographical area, or Geographical Subscriber Area (GSA). Now there is a third service provider, called NEXTELL, which has been approved by the Federal Communications Commission to install and operate said third Enhanced Specialized Mobile Radio (ESMR) service. This third ESMR service is based upon a ESMR, in Europe called Global Specialized Mobile (GSM). Such ESMR services are being installed and activated all over the U.S., and in other countries National Subscriber Areas (NSA).

The preferred embodiment of the present invention provides for national service implementation using the methodology and apparatus herein described. One Master Central Monitoring Station (MCMS), can manage, monitor and control an entire Application Specific Network (ASN). Various Application Specific Central Monitoring Stations, (ASCMS) can be located in various metropolitan and rural subscriber areas, and operate various application specific services throughout existing Cellular Mobile Telephone (CMT) networks and Enhanced Specialized Mobile Radio networks (ESMR). These networks are presently linked by communications pathways, such pathways also link Base Stations (BS) to Mobile Switching Centers (MSC). These communication links also physically connect other Cellular Mobile Telephone (CMT) and Enhanced Mobile Radio (ESMR) systems which operate with similar communications protocols. Such protocols as SS7, X.25, ISDN, C7 Red and Blue, ANSI and CCITT TCAP and other such communication data management formats, provide inter system control from transmission tower or Base Stations (BS) which are strategically placed around a Geographical Service Area (GSA) and connected to a Mobile Switching Centers (MSC), in order to serve and manage a particular Metropolitan Subscriber Area (MSA) or Rural Subscriber Area (RSA).

The inter-system and intrasystem data control and system management links, can be provided by Publicly Switched Telephone Networks (PSTN), line of sight microwave links, links provided by geosynchronous orbit satellites, and other similar types of communications links. Region to region links can be provided by various satellite service providers, a region as applied here can be deemed a separate country or nation. Such satellite service providers as INMARSAT, COMSAT, and other U.S. and international satellite service providers can provide communications pathways to and from Global Specialized Mobile (GSM), which is a form Enhanced Mobile Radio (ESMR) systems located throughout Europe. Other European cellular systems can be linked in this manner, and a Master Central Monitoring Stations (MCMS) and an Application Specific Monitoring Stations (ASMS) can be linked throughout the world by the combination of land links, microwave links and satellite system links. Regional Master Central Monitoring Stations (RMCMS) act as communication system control hubs. These communication control hubs, can manage a Master Central Monitoring Stations (MCMS) which in turn manage Application Specific Central Monitoring stations (ASCMS) throughout the world. The Regional Master Central Monitoring Stations (RMCMS) and Master Central Monitoring Stations (MCMS), are connected directly to the Roamer Data Base (RDB) by the Roamer Port (RP) of a centralized Mobile Switching Center processing switch (MSC), which acts as a Home Switch (HS) or "Home Switch". In one preferred configuration, the Home Switch (HS), is the primary system control point in conjunction with a Master Central Monitoring Station (MCMS). The Home Switch (HS) acts as a central processing point of all other Mobile Switching Centers (MSC), confined within one Geographical Subscriber Area (GSA), a Metropolitan Subscriber Area (MSA), a Rural Subscriber Area (RSA), or an entire region or country. The Home Switch (HS) is physically connected to other Mobile Switching Centers (MSC) via electronic digital communication links. Such communication links act as pathways whereby different communication protocols carry various forms of electronic data. Since any Mobile Switching Center (MSC) can act as a Home Switch (HS), a Regional Master Central Monitoring Station (RMCMS) and or Master Central Monitoring Station (MCMS) can be connected to the Roamer Port (RP), or Signalling Port (SP) of that particular switch, which provides physical access to electronic data roamer information. The roamer information can be utilized to manage and control Application Specific Subscriber Apparatus (ASSA). The present invention manipulates, translates and encrypts this data. Such data contained in the Mobile Identification Numbers (MIN) and Shared Secret Data (SSD), A-key data, User Data (UD) and other related data is thus utilized in the preferred embodiment of the invention in a novel manner, thus adding an entirely new an innovative means of providing additional subscriber specific and application specific services to existing Cellular Mobile Telephone (CMT) networks, Enhanced Specialized Mobile Radio (ESMR) networks, and Personal Communication System (PCS) networks.

Application of the present preferred method and apparatus is not confined to utilizing Roamer Data Base (RDB) data. The Regional Master Central Monitoring Station (RMCMS) and the Master Central Monitoring Station (MCMS) can be connected to other data control signalling interfaces physically located and interfaced with, the Mobile Switching Center (MSC), the Base Station (BS) and other signalling pathways which connect to Roamer Data Bases (RDB) and other types of Mobile Cellular and Enhanced Mobile Radio (ESMR) systems. When a particular Metropolitan Subscriber Area (MSA) or Rural Subscriber Area (RSA) is interfaced to the aforementioned application specific services, said services can be confined to that particular home system, and thereby does not have to operate from a Roamer Data base (RDB). Local registration, authentication, and system management control data communications pathways can be interfaced to a single Central Monitoring Station (CMS), and confine said services to one Metropolitan Service Area (MSA), or one Rural Subscriber Area (RSA), with one Home Switch (HS) in the described aforementioned manner. Said Geographical Subscriber Areas (GSA), may utilize a Cellular Cellular Mobile Telephone (CMT) (CMT) system, a Enhanced Specialized Mobile Radio (ESMR) system, a Personal Communications System (PCS), or a Global Specialized Mobile (GSM) mobile communications system, without necessarily communicating said application specific information to other Enhanced Mobile Radio (ESMR) and Cellular Mobile Telephone (CMT) systems, that operate outside of said Geographical Subscriber Area (GSA).

The present preferred embodiment of the invention allows for free voiced based communications pathways to provide other services that are needed, which traditionally are related to voice pathway communications. One of the drawbacks of current Cellular Mobile Telephone systems (CMT) and Enhanced Mobile Radio (ESMR) systems, is the limit to the number of channels available for use, which causes frequent system overload. This limit is a technological limitation of current systems, and related to current government regulation, for the Federal Communications Commission allocates only so many frequencies and channel slots for system use. The present invention communicates in short high speed data bursts over the control channels, and digital-traffic channels, and will in no way create traffic overload on the over all system architecture, system load capacity, infrastructure and normal voice based call processing operations.

Preferably, a Regional Central Monitoring Station (RCMS) is provided which manages and controls an entire country or National Service Area (NSA), or a particular region of a given National Service Area (NSA). This is accomplished by interfacing with a National Service Areas (NSA) established Cellular Mobile Telephone (CMT), Enhanced Specialized Mobile Radio (ESMR), Personal Communications System (PCS), or Global Specialized Mobile (GSM) network. Such systems are typically interconnected to a Roamer Data Base (RDB), and any other interconnected signalling system. In another embodiment the present inventions operating system can be linked by cooperating Roamer Data Bases (RDB). A Roamer Data Base, (RDB) is part of the control management operational scheme, and it is a communications system in which Cellular Mobile Telephone (CMT) and Enhanced Specialized Mobile Radio (ESMR) systems are linked by the aforementioned communications pathways and protocols. The Roamer Data Bases (RDB) communicate directly with a plurality of Mobile Switching Centers (MSC) which are located throughout a country, a city or other Geographical Service Areas (GSA). Such Mobile Switching Centers (MSC) control and manage a multitude of transmission tower Base Stations (BS) which directly serve Application Specific Subscriber Apparatus (ASSA).

Subscriber information, such as subscriber identification, mobile unit Electronic Serial Numbers (ESN), Mobile Identification Numbers (MIN), Shared Secret Data (SSD), A-Key Data, CAVE algorithm, Rand Shared Secret Data, Dialed Numbers, Personal Identification Numbers (PIN), User Data (UD), Filler Data (FD), Reserved Formats (RF) Additional Data (AD) and other subscriber mobile unit apparatus specific information is stored and managed at the Mobile Switching centers (MSC). These Mobile Switching Centers (MSC) contain data bases herein termed Home Location Registers (HLR) and Visitor Location registers (VLR). The Roamer Data Bases (RDB) are linked by the aforementioned communications pathways and protocols to the Home Location registers(HLR) and Visitor Location registers (VLR). The Home Location Registers (HLR) and Visitor Location registers (VLR) contain aforementioned subscriber specific information. For example, when a Enhanced Mobile Radio (ESMR) subscriber visits or roams in a service area that he is not subscribed to as his home service system, intrasystem communication pathways provide subscriber specific data base updates. If a user whom subscribes to a Enhanced Mobile Radio (ESMR), or a Cellular Mobile Telephone (CMT) service provider in New York, for example, visits or roams in a Enhanced Mobile Radio (ESMR) system in Miami Fla., the system electronically checks the roaming subscribers service record at the originator home system providers subscriber specific data base through the aforementioned intrasystem communications pathways. This is accomplished by means, preferably a program operably linked to the Enhanced Mobile Radio (ESMR), and Cellular Mobile Telephone (CMT) communications apparatus using a code termed a System Identification Designation (SID) number. A System Designation Number (SID) is assigned to each Metropolitan Subscriber Area (MSA) and Rural Subscriber Area (RSA) by the Federal Communications Commission, and each mobile subscriber unit is electronically programmed with such particular System Identification Number (SID). When a subscriber places a call, or transmits application specific data, to the Enhanced Mobile Radio (ESMR) and or Mobile Telephone (MT) service provider, the provider utilizes the System Identification Designation (SID) number as a means by which the visiting subscribers home system is identified. Thus the identification of said home system provider is revealed, and the home system provider is then accessed, so as to properly identify which system a particular subscriber is assigned to. Once this is accomplished the Enhanced Mobile Radio (ESMR) subscriber is electronically given a roamer number and allowed to make calls and receive calls in that particular service area. A preferred embodiment of the present invention operates similarly, except the user, sends and receives an encrypted control channel data, which acts as an additional communications system which can be implemented and integrated with various Cellular Mobile Telephone (CMT) and Enhanced Mobile Radio (ESMR) network systems.

Another means of identifying Cellular Mobile Telephone (CMT) and Mobile Radio (MR) subscribers home system, for example, is by electronically examining the first three digits of the Mobile Identification Number (MIN). This is number is a normal area code number, such as 408, 310, 415, which is part of a normal 10 digit telephone directory number. This number is also called the Number Plan Area number (NPA). Each operating home cellular Cellular Mobile Telephone (CMT) system, Enhanced Specialized Mobile Radio (ESMR) system, Personal Communications System (PCS) and other centrally controlled communications system which interact with land based, hard wired telephone networks are assigned a three digit NPA area code number.

The method and apparatus of the present invention allows for point to point communications capabilities, that is; sending commands or manipulated data from a centralized monitoring and control center to an application specific communicator apparatus thereby providing individual commands to individual subscribers. Transmitting status reports from the specific communicator apparatus back to a centralized monitoring and control center is also possible. Additionally, the present invention provides for digital data dispatch commands to be sent to groups of application specific communicator apparatus preferably in the form of widely dispersed messages transmitted to each individual Application Specific Communicator Apparatus (ASCA) by a Command System (CS) which sends individual codes to each communicator apparatus, which are parts of larger application specific service groups. Prior Cellular Mobile Telephone (CMT) systems have been incapable of sending blanket dispatch user specific communication messages in this manner. Such status reports encompass but are not limited to; location and positioning information that relates to Global Positioning System (GPS) vectoring, triangulation, contact closure and opening information that relates to security status information in homes, business and motor vehicle anti-theft systems. Such encrypted data messages created by the present invention also provide velocity and direction information, power on and power off commands and information, information that relates to managing public utility information, automatic utility meter reading, timer on and timer off control for traffic signalling equipment, and a host of other application specific processes. The apparatus can be sent commands from different central monitoring stations to directing the performance of desired functions, such as turn on and turn off, reset, send update location information, go to next designated location, and many others.

Using the method and apparatus of the present invention an enormous amount of data can be transmitted and received over the different control channel systems utilized by many different radio communication subscriber based systems such as Cellular Mobile Telephone (CMT) and Enhanced Mobile Radio (ESMR), and the preferred method and apparatus of the invention can be utilized by Personal Communication Systems (PCS) data control communications pathways, resulting in a truly immense number of applications. The efficiency and simplicity of the preferred method and apparatus of the present invention is evident. Most importantly, the present invention can be implemented and placed into operation without Enhanced Mobile Radio (ESMR) and Cellular Mobile Telephone (CMT) system infrastructure upgrades, and when the present invention is implemented, it will not cause disruption or system overload once in full operation.

The preferred method and apparatus of the present invention allows for an application-specific communications apparatus to receive an application specific message for control and communication with the application specific apparatus, for example, location and non-location data of specific service apparatuses. The location and non-location application specific communications apparatus is preferably configured and manufactured to data communications and control operations. Such operations as location specific motor vehicle tracking, motor vehicle anti-theft and recovery, shipping container tracking, personnel tracking, and other location based data communications services can be provided by configuring the location Cellular Mobile Telephone (CMT), and Enhanced Mobile Radio (ESMR) communications apparatus, in accordance with the hereinafter described specific nomenclature and design parameters to accomplish electronically the application specific communications and control processes as described.

Stationary communicator apparatus means which are non location specific include utility management and control, roadside call box add-on services, remote traffic signal control, security system status reporting, and other related services, can be designed and implemented to provide application specific communications and application specific control processes. The present invention also provides for a hybrid location and non-location method and apparatus for control and management of recreational game information. For example, video games such as Sega Games and Nintendo can be configured to send data such as game scores and other game related data over aforementioned control channel and digital traffic channels to a Central Monitoring Station (CMS) which is interfaced with the Application Specific Central Monitoring (ASCM), which in turn is interfaced with a cable television operations headend and control system. This cable television headend sends game information over a dedicated cable channel that serves these video game players. The channel acts as a video bulletin board and displays game scores and other data. These channels and scores can be regionalized, that is scores can be received by all of the game players nationally or to a group or one person playing a video game in his home and competing with other game players next door or across the country. The game players module will contain the present inventions application specific circuitry which manipulates, translates and encrypts, control channel data and digital traffic channel data, and transmits this data into aforementioned Cellular Mobile Telephone (CMT), Enhanced Specialized Mobile Radio (ESMR), and Satellite Hybrid (SCH) systems. This data is preferably relayed via a plurality of transmission towers, base stations, mobile switching centers, and onto central monitoring stations, and finally to cable television system headends which provide an electronic bulletin board system which is transmitted to the game users watching the cable system game channels. Game information is preferably transmitted periodically from individual game user modules into the aforementioned networks in order not to cause any control channel or digital traffic channel overload. Alternatively, this information can be downloaded at night or early in the morning, once or twice during a twenty four hour period. There are many variations of this interactive game system that can be implemented by utilizing the present inventions method and apparatus.

The application specific communicator apparatus preferably contains within specially designed circuitry means, by which, it may add additional data, manipulate, translate, encrypt, transmits, and receives data such as Mobile Identification Numbers (MIN). Such circuitry means takes Normal Mobile Identification Numbers (NMIN) and creates Modified Mobile Identification Numbers (MMIN). The Modified Mobile Identification Numbers (MMIN) are utilized to send and receive encrypted messages to and from the central monitoring systems that retrieve and transmit said Modified Mobile Identification Numbers (MMIN) through Cellular Mobile Telephone (CMT) systems, and Enhanced Mobile Radio (ESMR) systems, and Personal Communications System (PCS) in a transparent manner. The term transparent as used herein, describes the operational condition of the present invention which does not overload, disrupt, or cause any operational problems with normal Cellular Mobile Telephone (CMT) and Enhanced Mobile Radio (ESMR) voice based communications operations, especially in terms of traditional control channel and digital traffic channel operations.

The application specific communicator apparatus preferably contains a specially designed circuitry means by which it manipulates, translates, encrypts, transmits and receives control channel data, in addition to creating a Modified Mobile Identification Numbers (MMIN). Such data and process called Shared Secret Data (SSD), can be modified and encrypted. The circuitry means takes Normal Shared Secret Data (NSSD) and creates Modified Shared Secret Data (MSSD). The Modified Shared Secret Data (MSSD) is utilized to send encrypted data messages to central monitoring data terminals in the same way Normal Mobile Identification Numbers (NMIN) are modified; manipulated, translated and encrypted by the present inventions electronic processes and design. Other data such as User Data (UD), Filler Data (FD), Reserved Formats (RF), and Additional Data (AD) can also manipulated in the same manner. The application specific communicator apparatus further contains specially designed circuitry means which correlate and adds additional data bits which carry GPS coordinates, security status, electrical load control status, and other application specific status and command control information. This same specialized circuitry also performs manipulation, translation, encryption and transmission tasks of GPS information. The Central Monitoring Stations (CMS) contain data management and control systems means which receive the encrypted data from Cellular Mobile Telephone (CMT), and Enhanced Mobile Radio (ESMR) networks Mobile Switching Center (MSC) signal processing systems. This data preferably originates from the Application Specific Communicator Apparatus (ASCA), where it is processed, evaluated, and electronically acts upon its command data meaning. Then Central Monitoring Stations (CMS) data management and command data terminals sends encrypted command data from the central monitoring station, over the control channel, intersystem, and intrasystem data communications pathways, to the cellular telephone and Enhanced Specialized Mobile Radio (ESMR) Mobile Switching Center (MSC), which in turn relays said command data to strategically located transmission tower Base Stations (BS), which further relays the manipulated, translated and encrypted data to the Application Specific Communicator Apparatus (ASCA). The ASCA receives the application specific command data and acts electronically according to the application specific electronic processing and interpretation of said command data. Other control channel specific data such as A Key data, CAVE Algorithm, RAND Shared Secret Data, Dialed numbers, User Data, Filler Data, Reserved Formats and personal identification numbers (PIN) can be manipulated, translated, and encrypted in order to send and receive data message instructions to the application specific communicator apparatus, and such data can also be transmitted from the same apparatus. These processes are all accomplished without creating any sort of overall system disruption, overloading, or violate any governing operational and signalling standards by which said encrypted data is received from, and transmitted to said central monitoring station data management and control terminals. Preferably, all of the control data is transmitted by the Application Specific Communicator Apparatus (ASCA) to the Central Monitoring Station (CMS) by way of Cellular Mobile Telephone (CMT) and Enhanced Specialized Mobile Radio (ESMR) network control channel data processing and transmission systems; received, processed, relayed, and in turn transmitted back to the Application Specific Communicator Apparatus (ASCA) by a technically and logistically participating Cellular Mobile Telephone (CMT) network system, and Mobile Radio (MR) systems, which include but are not limited to; Cellular Mobile Telephone (CMT), Enhanced Specialized Mobile Radio (ESMR), Motorola Integrated Radio System (MIRS), Personal Communications System (PCS), Satellite Cellular Hybrid systems (SCH) or by any other Cellular Mobile Telephone (CMT) or Enhanced Specialized Mobile Radio (ESMR) system which depends upon a central data management scheme in which the process of subscriber registration, authentication, internal system data management, system maintenance, anti-fraud management, and other intrasystem data management processes and control communications. The overall system and data management schemes are preferably transmitted on control channels. Other processes such as managing roamer data bases, or managing any multi-system data management protocol which encompasses related remote processes such as; registration, authentication, data management, call processing, and other processes commonly considered and designated as control channel data communications and digital control channel communications, and digital traffic channel communications may also be utilized and applied with the present method and apparatus.

According to another aspect of the invention, there is provided a group of central monitoring, Wireless Communications Application Specific Enabling System (WCASES), data retrieval, data decoding, data distribution, data storage, and command data control method and apparatus. The Data Reception and Distribution terminal (DRD), data Decoder terminal (DEC), Comparative Data Base terminal (CDB), and Command Data Control terminal (Command Data Control), and other interface and communications components preferably comprise the central components of a WCASES Central Monitoring Station (CMS). Further, such nomenclature as, Regional Data Reception and Distribution terminal (RDRD), Regional Decoder terminal (RD), Regional Comparative Data Base (RCDB), and Regional Command Data Control terminal (RCDC), Master Data Reception and Distribution terminal (MDRD), Master Decoder Terminal (MDRD), and Master Command Data Control terminal (MCDC), Application Specific Data Reception and Distribution terminal (ASDRD), Application Specific Decoder terminal (ASD), and Application Specific Command Data Control terminal (ASCDC) all are designated as data retrieval, distribution, storage, and command systems which encompasses and comprise the present inventions Central Monitoring System (CMS).

In another embodiment, the invention allows for the modification of Cellular Mobile Telephone (CMT), Enhanced Mobile Radio (ESMR), Personal Communications System (PCS) processing switch software located electronically within processing switches in-the Mobile Switching Centers (MSC). Preferably contained withm all processing switches is software allowing for specific management of the electronic processes of; registration, authentication, anti-fraud processes, and additional call feature and data processing. Key processing switches located within a Mobile Switching Center (MSC) are connected and operational with the present invention method and apparatus and may be used with small registration software and processing modifications or patches. These processing switch software modifications do not disrupt, alter, or violate the operational integrity or system security of the Cellular Mobile Telephone (CMT), and Enhanced Mobile Radio (ESMR). The CMT and ESMR preferably include, but are not limited to, Cellular Mobile Telephone (CMT), Enhanced Specialized Mobile Radio (ESMR) systems, Personal Communications System (PCS), Global Specialized Mobile (GSM) network systems, or any other communications system. This aspect is critical to successful system operations and system security. The only feature that is modified in the processing switch software is the feature that handles the registration, authentication and processes that effect the present inventions operational scheme.

The present invention is a multi-featured wireless communications application specific enabling system, which includes means for reading, analyzing, controlling and communicating through various wireless communication networks and the signalling, control channels, and through the digital traffic channel that operate within these networks. Preferred networks which may be utilized include Cellular Mobile Telephone (CMT), Enhanced Specialized Mobile Radio (ESMR) NEXTELL, Specialized Mobile (GSM), Personal Communications System (PCS), Satellite Cellular Hybrid (SCH) system. Additionally, any wireless communications system that depends upon centralized control via data control channels and digital traffic channels for the purposes of user registration, billing, internal system maintenance, internal system security, sending user information, and other related operations, is immediately usable by the present inventions apparatus and methodology. Further any wireless-communications system which utilizes separate data control channels and digital traffic channels for such aforesaid operations can be utilized and adapted for the present inventions application specific communications, operations and application specific communications apparatus.

The invention includes means for remote monitoring and calculating an objects, or person's location. For, example, a motor vehicle's location, a person's location, or other moveable objects position, direction, detect local status events, and like, and calculating a system response based on a plurality of weighted variables. From such calculated response, the system notifies the user of various status parameters of the object or person being monitored. In certain circumstances, the system may be used to notify an application specific central monitoring station via two-way data control channels and digital traffic channels to allow the central monitoring station to respond appropriately to various situations such as summoning emergency vehicles, police, private security personnel, medical personnel, and other such emergency response services. Provision of a two-way control data channel and digital traffic channel communications system also allows the Central Monitoring Station to positively verify the message which was sent by the motor vehicle, person or moveable object being monitored or located.

The preferred embodiment of the apparatus for direct wireless communication on an existing wireless communication network present includes a plurality of computer displays and computerized graphic maps which display the relative position and status of an object or person being monitored, such as a motor vehicle, person or moveable object, derived from Global Positioning System (GPS), or other vectoring, triangulating, and other relative position computing system. Other methods of establishing a location can garnered by user input or by other automatic sensors and location systems, thereby providing a highly accurate realtime tracking and status communication enabling system.

The preferred apparatus for direct wireless communication also includes an integrated location system, a communication network via data control channels, and a plurality of digital traffic channels mapping systems operably coupled to status response systems, and application specific dispatch capability via a Master Central Monitoring Stations (MCMS), and an Application Specific Central Monitoring Stations (ASCMS). The location aspect of the present invention is especially suitable for use in fleet vehicle management, vehicle theft deterrent, stolen vehicle tracking, railroad car tracking, cargo location, and so forth. The apparatus when applied with the method of the present invention may be customized to a particular user's needs and, due to the preferred embodiment's use of the GPS and other location designation systems, coupled with the present invention's adaptability, may be installed and used virtually anywhere in the world.

A plurality of calculating and control elements are preferably fixed in a given location various. Such elements or devices can be interfaced with an unlimited number of systems and apparatus which perform very simple tasks or complex tasks. Preferably such elements control and detect electrical device voltage loads, detect and report security system status data, for use in commercial and residential buildings, control traffic signals, interfaces with roadside call boxes to provide existing data for manipulation and communications tasks such as measuring road conditions, counting vehicles that pass by, measuring local temperature, and many other related application specific functions. Other applications include collecting and reporting video game scores and other interactive data, and operate conjunctively with Direct Broadcast Satellites and cable television networks. Such fixed location elements or devices also calculate a system response based on all sorts of weighted variables, and report said variables to electronic Billboards (BBS). Such fixed location elements also respond to both existing data, manipulated data, and application specific messages and commands, and report the results of said data messages and commands to an Application Specific Central Monitoring Station (ASCMS) via data control channels and digital traffic channel that are operated by aforementioned wireless communications networks that depend upon aforementioned centralized controls. In certain circumstances, if desired, the fixed application specific communication apparatus reports the status of an electrical load control device, by transmitting data information on aforesaid data control channels that reflect whether the load control device detects voltage or not.

The electrical load control device can be commanded to turn on an electrical device or turn it off, by receiving said messages or instruction commands directly from data control channels, which are being operated by aforementioned wireless communications networks. These data messages or instruction commands originate from an Application Specific Central Monitoring Station which is connected by various communications means to a Master Central Monitoring Station (MCMS) which is connected to a Home Switching or Mobile Switching Center which is an integral central operating and communications control point in any of the aforementioned wireless communication networks.

The preferred embodiment of the present invention provides computer terminal displays, which project status reports of various application specific stationary and mobile location devices. Such common devices include facsimile machines, consumer level computer systems and other related devices which can act as application specific central monitoring stations for fleet management configurations and motor vehicle anti-theft and recovery configurations. The fixed location elements or devices can be customized to a particular user's needs and due to the preferred embodiment's total adaptability and flexibility may be installed and used virtually anywhere in the world. Of great significance is that the method and apparatus of the present invention does not require any wireless communication network infrastructure upgrades, extensive modifications and is immediately applicable and usable with the aforementioned wireless communications systems.

Figure 1B:
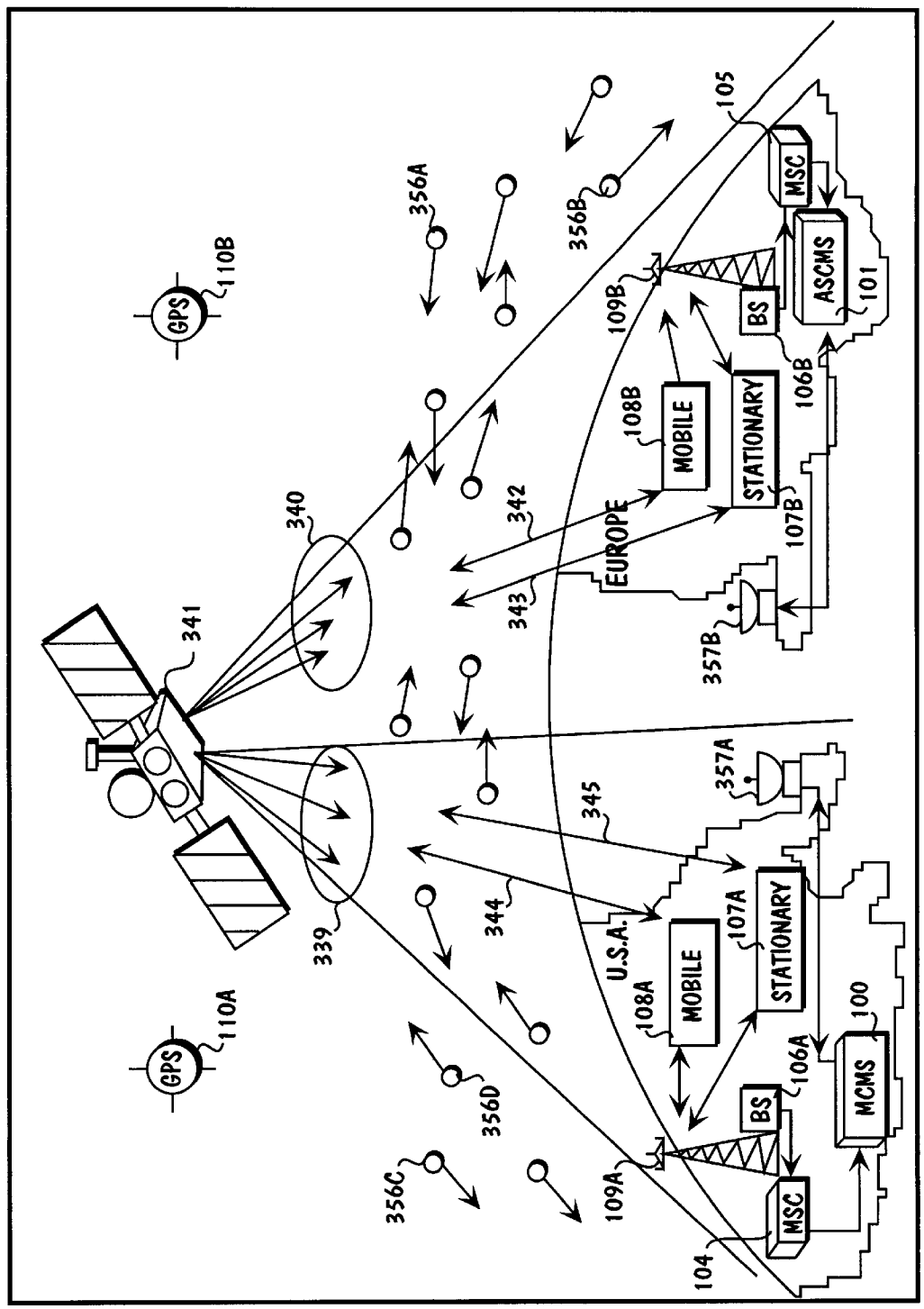

Referring now to FIG. 1A and FIG. 1B which show a preferred embodiment of invention including a set of "Stationary Units" 107A–107B, and a set of "Mobile Units" 108A–108B. A stationary unit may represent any sort of fixed, non moveable interface application such as a electrical load control management apparatus, video game management system, security system status reporting, roadside call box, or any other stationary communications application. The present invention acts as a communications interface, or enabler of communications for the operations and remote control of said fixed systems. A mobile unit can be attached and interfaced with any sort of moveable object like a motor vehicle, a person holding or wearing a communicator apparatus as in a home arrest application, medical alert application, or a cargo shipping container which contains the present inventions communications enabling technology. Such mobile objects or persons are to be monitored, located and tracked. A communications link is provided, which is represented by wireless communications transmission towers 109A and 109B, Base Stations 106A and 106B, Mobile Switching Centers 104 and 105, Integrated Services Digital Network (ISDN) 112A–112C, Public Switched Telephone Network (PSTN) 111, which carry specialized data strings which are manipulated, translated and encrypted, data control channel information between the Stationary Unit 107A, 107B and the Mobile Unit 108A, 108B, and a Master Central Monitoring Station (MCMS) 100 and a Application Specific Central Monitoring Station (ASCMS) 101.

Figure 2:
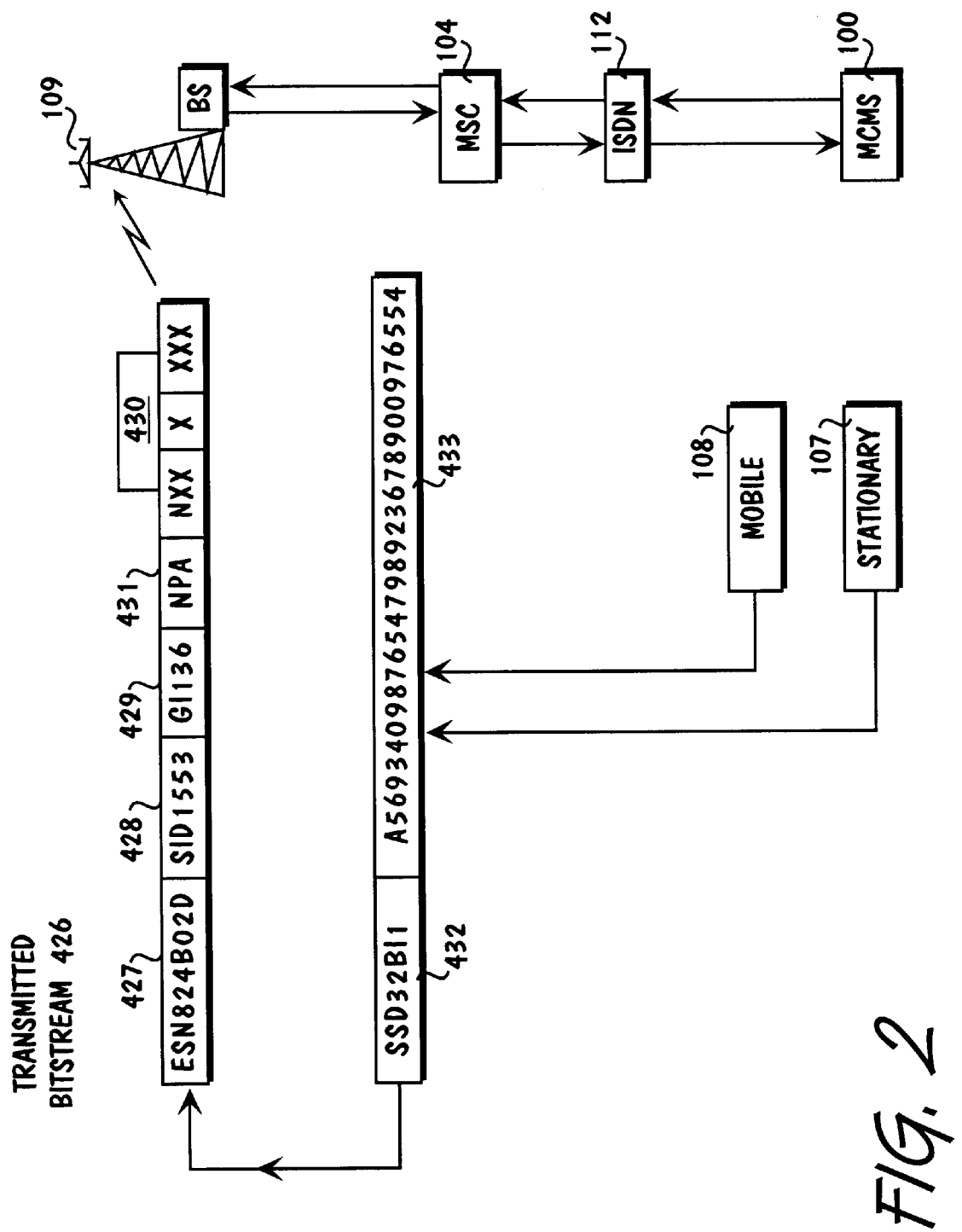
FIG. 2 is a flow chart illustrating the operation of transmittal of manipulated data and translated data into a wireless communications network, according to the invention.

The central monitoring station and application specific central monitoring station is preferably manned by one or more trained operators 135A and 135B. Referring to FIG. 1A The Master Central Monitoring Station (MCMS) 100 contains processing systems. Inside the (MCMS) 100 are the Master Data Reception and Distribution terminal (MDRD) 113, the Master Decoder (MDEC) 114, and the Master Comparative Data Base (MCDB) 115. The MDRD receives, intercepts and scans all the data that normally flows on aforementioned control, signalling channels and digital traffic channels. That is, the MDRD identifies and selects the data that is WCASES specific. The MDRD scans or "looks" at control, digital traffic channel and signalling channel data strings. Referring to FIG. 2 Transmitted Bitstream 426, each WCASES application specific Mobile Unit 108 or Stationary Unit 107 has its own distinctive Electronic Serial Number (ESN) 427, System Identification Designation number (SID) 428, Group Identification number (GI) 429, Mobile Identification Number 1 (MIN1) 430, Mobile Identification Number 2 (MIN2) 431, and in some circumstances Shared Secret Data (SSD) 432, also additional characters of information can be added to control and digital traffic channel bit streams which serve no other purpose but to contain application specific information such as location specific, identification specific and status specific data.

In normal control channel operations and digital traffic channel operations, data bit streams contain reserved formats, filler messages, and user data. Such data are data bits that essentially take up space in a synchronous control channel and digital traffic channel message. These reserved formats, filler messages, or user data bits can be used in the method and apparatus of the present invention to provide Additional Application Specific Messaging Data (AASMD) 433 on the Control Channels and Digital Traffic Channels of Cellular Mobile Telephone (CMT), Enhanced Mobile Radio (ESMR) Satellite Cellular Hybrid (SCH), or any other wireless communications system that uses reserved formats, filler data, and user data, in the control channel and digital traffic channel messaging schemes. These communication systems rely upon centralized control for aforementioned operations. The mobile unit and stationary unit send and receive application specific status messages and command or instructional messages. When the stationary unit is transmitting status or any other information, it is sent to the nearest Transmission Tower 109A or 109B and Base Station 106A or 106B. Aforesaid transmitted data is then relayed to its Mobile Switching Center (MSC) 104 or 105, and then relayed to the Master Central Monitoring Station (MCMS) 100.

In reference to FIG. 1A, the Master Data Reception and Distribution (MDRD) 113 terminal, identifies WCASES data strings by recognizing distinctive WCASES specific data information as depicted in FIG. 2. In FIG. 2, the ESN 427, SID 428, and GI 429 is assigned to a Mobile Unit 108A or 108B, or a Stationary Unit 107A or 107B.

Referring to FIG. 1A the MDRD 113, retrieves this information from the control data bit stream and distributes said information to the Master Decoder (MDEC) 114. In some applications, the configurations of the control data bit stream and digital traffic channel bit stream is synonymous with other signalling operations that encompass Roamer Data Bases, T1 and T3 carriers, SS7, X.25 communications protocols, and other control channel, digital traffic channel and intersystem signalling pathways.

Figure 3:
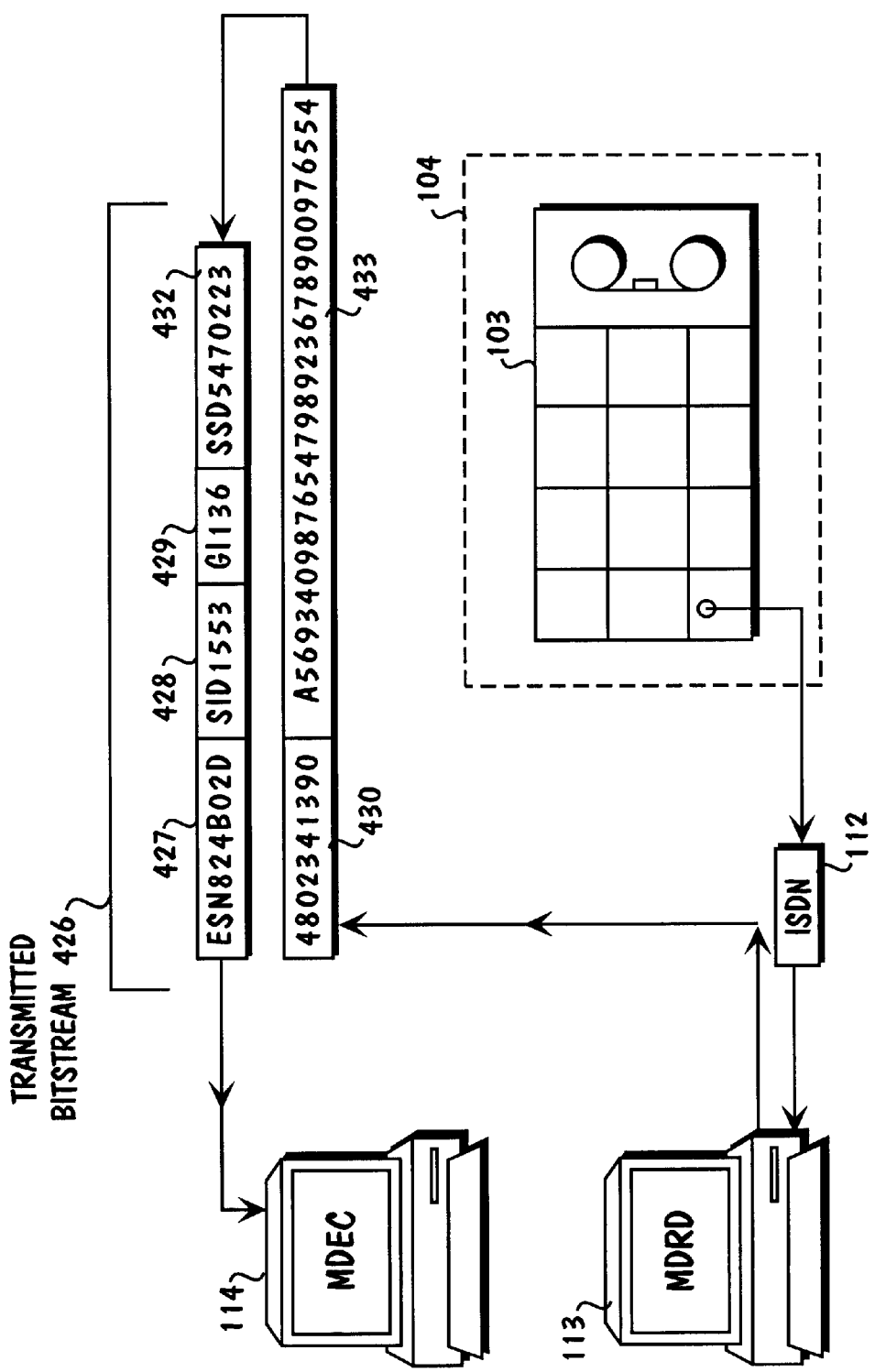
FIG. 3 is a flow chart illustrating the method of receiving manipulated and translated data, and the processing of such data, according to the invention.

In reference to FIG. 3 the MDEC 114 deciphers the manipulated and translated data received from the MDRD 113 which is connected to the Home System Mobile Switching Center (MSC) 104 via an ISDN interface 112, and determines what type of unit transmitted said data, and the application specific configuration of said Mobile Unit 108 or Stationary Unit 107, as illustrated in FIG. 2.

Figure 4:
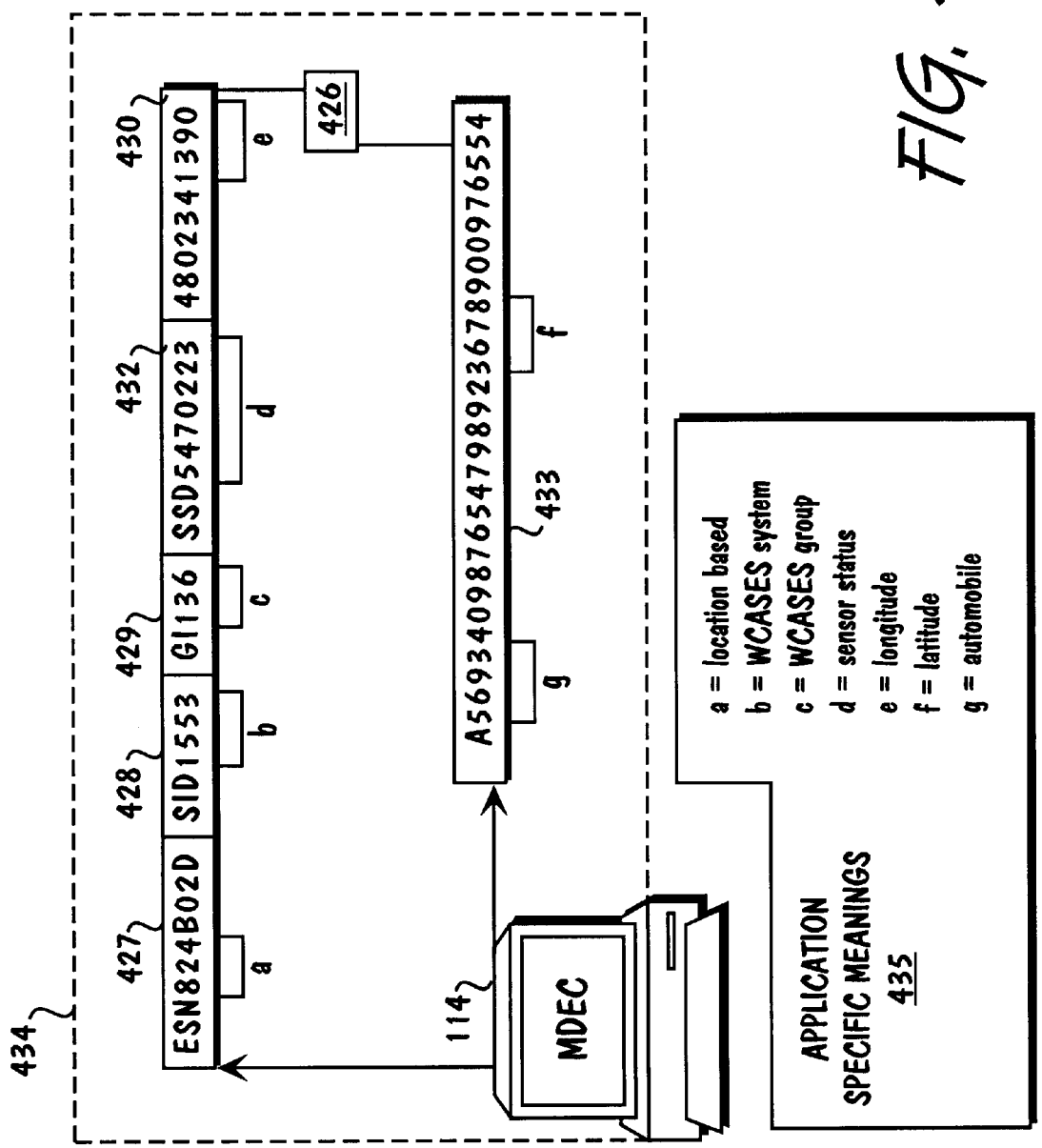
FIG. 4 is a flow chart illustrating the method of decoding the manipulated and translated data, according to the invention.

Referring to FIG. 4 the MDEC 114 is shown as having decoded the Transmitted Bitstream 426. In this application it is designated a Mobile Unit configured for Motor Vehicle anti-theft tracking and recovery. The ESN 427, the SID 428, the Group Identification 429, SSD 432, MIN group 430, and Additional Data 433 are standard to Cellular Mobile Telephone (CMT) and Enhanced Mobile Radio (ESMR) network voice and data operations. However, this data is expressed here in a standard synchronous bit stream form, which is essentially transparent to the network, however in terms of WCASES transmitted data, the decoded data breakdown is illustrated here. The Application Specific Meaning 435 relates to the letters that bracket numerical characters, 'a' through 'f,' indicate the numbers being manipulated, encrypted and translated. In an actual bit stream these characters or numbers are bits of data. However, for the purpose of illustration the data is converted from bit to decimal in FIGS. 2, 3, and 4. In FIG. 4, Bracket Characters 435 the 'a word' indicates the first three digits of the transmitted ESN 427. The number sequence 824 of the ESN 427, indicates that the Application Specific Meaning 435 'a word,' is a Mobile Unit. The 'b word' is the SID 428, indicates that this unit is a WCASES system subscriber, and which geographical and service region its MSC operates from. The 'c word' is GI 429 which indicates a Cellular System Group. This group indicator relates to the type system, that is whether it is a wireline or non wireline system, Metropolitan Subscriber Area (MSA) or Rural Subscriber Area (RSA). This particular unit is subscribed to and operates for billing, registration and authentication purposes. The bracketed number 163 of the Group Indicator 429, indicates that it is a Cellular Telephone based Mobile Unit, operating from a particular RSA (Rural Subscriber Area). Referring to FIG. 4 the Shared Secret Data SSD 432 'd word' indicates this particular motor vehicles security system sensor status which relates to whether the vehicles security system is in an alarm condition or normal non-alarm condition. Mobile Identification Number (MIN1) 430 can indicate various status conditions. In this Mobile unit configuration the last four digits or characters of the MIN1 numbers have been manipulated, translated and encrypted. The 'e word' of MIN1 430 indicates a longitude coordinate. In reference to FIG. 1A, these positioning-coordinates are supplied by Global Positioning System satellites 110A and 110B, however, these coordinates can be supplied other electronic wireless positioning systems which are commonly available and can easily interface with the present inventions electronic circuitry. In FIG. 4, Additional Data 433 contains many characters that represent user data, reserved formats, filler data or other types of control channel data and digital traffic channel data that are manipulated, translated and encrypted by the present invention. These characters in normal Cellular Mobile Telephone (CMT) or Enhanced Specialized Mobile Radio (ESMR) systems sometimes have no particular meaning, but act as additional data which simply take up needed space in a synchronous data string. Almost all existing control channels, digital traffic channels and other signalling channels transmit and receive data strings in a synchronous manner. These data strings are structured uniform data string lengths with a specified number of data bits. This operation scheme is utilized in order to maintain control channel and digital traffic channel data integrity, and contain capacity and timing of data movement, which occurs between transmission and reception channels, switch software and other systems that need controlled, synchronized and orchestrated parameters. Synchronized data movement also factors in channel capacity predictability, data error correction, and other activity. In FIG. 4, the entire operation of Data String Processing 434 and manipulation, translation and encrypting must accord to fully synchronized standards thus described. Individual Characters and Bits 426 that are manipulated, translated and encrypted, must 'look' like any other normal character and bit which are routinely transmitted and received on data control and digital traffic channels. In FIG. 4 Additional Data 433, and the 'f word' and 'g word' of Application Specific Data Meaning 435 are shown. The 'f word' 3679 which appears inside a bracket, indicates a Latitude Coordinate, and the 'g word' indicates that the Mobile Unit is installed inside a private automobile, as opposed to a fleet vehicle or other type of commercial vehicle.

Referring to FIG. 5, another type of control channel data format and process is illustrated and the manner in which the present method and apparatus utilizes, manipulates, translates and encrypts this type of control and traffic channel data. This illustration of the Digital Traffic Channel Structure Map 436, is contained within IS-54B, IS-41, ETS, Global Specialized Mobile (GSM), and Enhanced Specialized Mobile Radio (ESMR) NEXTELL which are national and international standards documents that set forth system operation and performance standards from the Telecommunications Industry Association (TIA), and European Telephone Standards (ETS) for Cellular Mobile Telephone (CMT) and Enhanced Specialized Mobile Radio (ESMR) networks in the United States, Europe and other countries. The Digital Traffic Channel Structure Map 436 illustrates data mapping in the form of bits, the identification of these bits, and what these bits represent. The method and apparatus of the present invention utilizes data such as User Data 437 and 438, and Reserved Data 439 for the purpose of sending instruction and command messages, or application specific messages, to various application specific Mobile Unit and Stationary Unit communications apparatus that operate under IS-54B, IS-41, ETS, and GSM operation parameters and guidelines.

In reference now to FIG. 6 a preferred method and apparatus for manipulating, translating and encrypting User Data 437 and 438 is schematically illustrated. In FIG. 6 a variation of user data is translated from bits to decimal characters that express application specific status messages and instruction commands that directly communicate to the mobile unit and the stationary unit communications apparatus while utilizing digital traffic channels. The present invention utilizes the digital traffic channel without any sort of disruption or significant increase of overall system capacity problems associated with voice channels and other related processes. In FIG. 6 Decoded Application Specific Data Meanings 435 are reflected here. The 'H word' bracketed in User Data 437 translates to 'H=Longitude' in the Status Response column of Decoded Application Specific Data Meanings 435. In this example the longitude calculation is expressed in standard mapping coordinate. However, there are many methods and means which encompass different topographical grid coordinate systems that are utilized by Global Positioning Systems and other location and tracking systems that depend on a coordinate reference calculated from triangulated reference points. Each one of the letters placed at the bottom of the bracketed numbers appearing within the User Data 437 and 438 relates to data that causes certain responses received at a Central Monitoring Station (CMS) through a Cellular Mobile Telephone (CMT) and a Enhanced Mobile Radio (ESMR) or a Satellite/Cellular Hybrid (SCH) system and certain actions initiated and completed by Mobile Unit and Stationary Unit Application Specific Apparatus, as response to said instruction commands as outlined in Decoded Application Specific Meanings 435.

Figure 7:
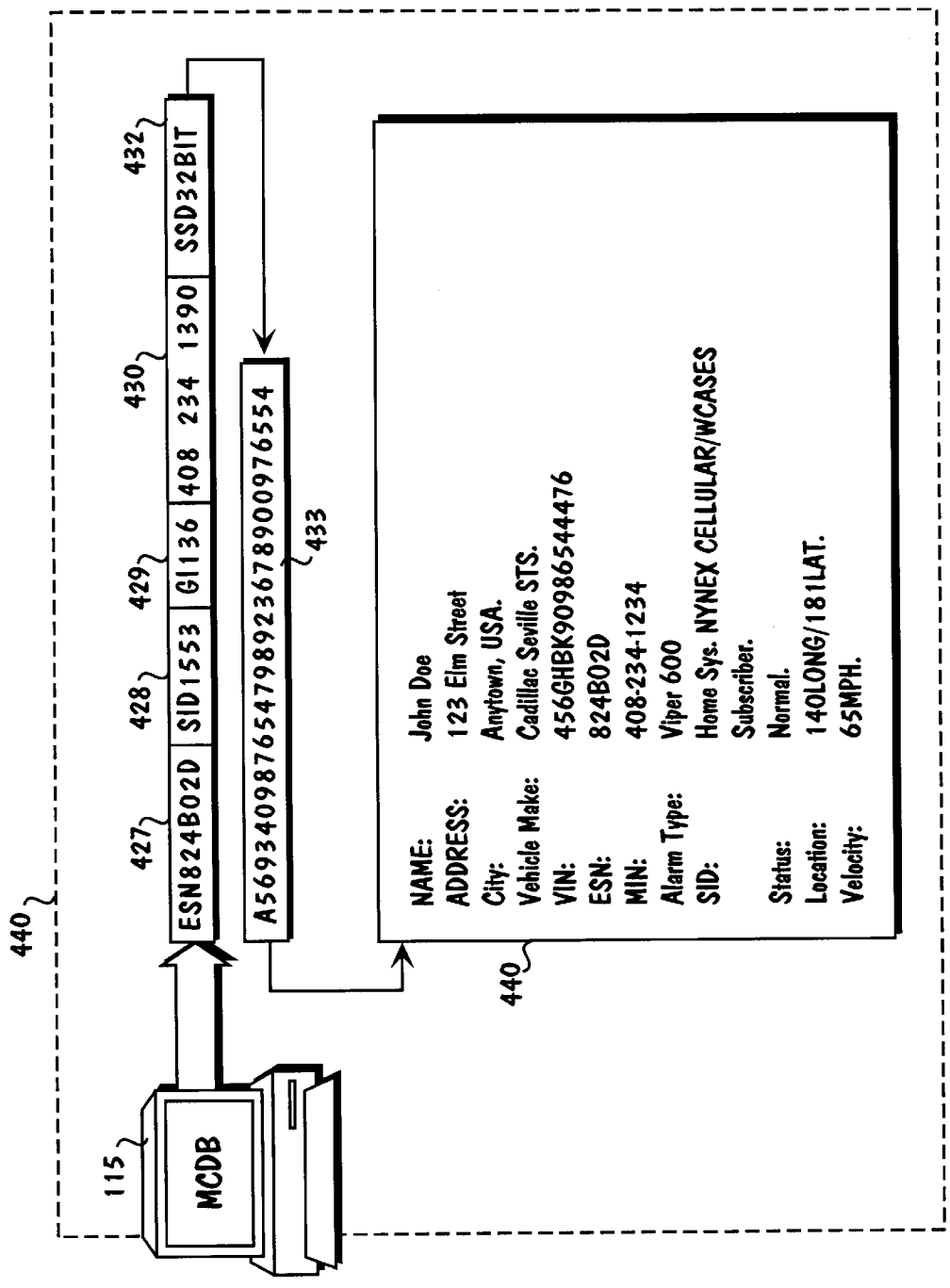
FIG. 7 shows decoded data in a comparative data bas interpretation of manipulated and translated data as it is sent from a wireless network, according to the invention.

In FIG. 1A the Master Comparative Data Base terminal (MCDB) 115 preferably collects decoded data from the Master Decoder terminal (MDEC) 114. While in FIG. 7, the Master Comparative Data Base (MCDB) 115 receives decoded data and searches which customer or client this particular string of data is attributed too. The Electronic Serial Number (ESN) 427 is preferably the set of numbers that identify the type of Mobile Unit or Stationary Unit communications apparatus that is installed in a particular motor vehicle. Also the ESN identifies who the customer or client is, and other pertinent data such as his address, make of vehicle, and the like. This is designated as Client Data 440. Client Data 440 also indicates the relative position of clients vehicle, velocity, and alarm status. During an alarm or emergency situation, this Client Data 440 is relayed to a designated Application Specific Central Monitoring Station or Dispatch Center. Referring to FIG. 1A, the Master Comparative Data Base 115 relays Client Data to the Application Specific Monitoring Station (ASMS) 100. As depicted here, this Application Specific Central Monitoring Station shows many different types of application specific terminals, which manage different application specific systems and services. In application, however, these various systems and services will be physically located in many different central monitoring stations or dispatch centers located throughout a city, a region, a country or the entire world. For example a Home Arrest (HA) Application Specific Terminal 120C can be located at another physical site, and the Master Central Monitoring Station will relay client data and status, for example, to this terminal via an Integrated Services Digital Network Interface (ISDN) 112A, the Public Switch Telephone Network (PSTN) 111 and another ISDN interface 112C and finally to the Home Arrest (HA) Application Specific Terminal 120C via an Application Specific Data Reception & Distribution Routing Terminal 127 and internal fiber optic or hardwire conductors of the Data Receive Digital Data Pathway 132 located inside an Application Specific Central Monitoring Station 101.

Conceivably a wide variety of application specific service terminals can be located in one monitoring facility as depicted in FIG. 1A. Such application specific service terminals preferably function as Utility Management (UM) 119C that manage utility company load control devices which detect and control electrical voltage of an entire electrical city grid or a single residence or business, or a particular load control apparatus which controls and detects voltage to an individual system control such as a swimming pool motor located in a residence or apartment complex.

Figure 8A:
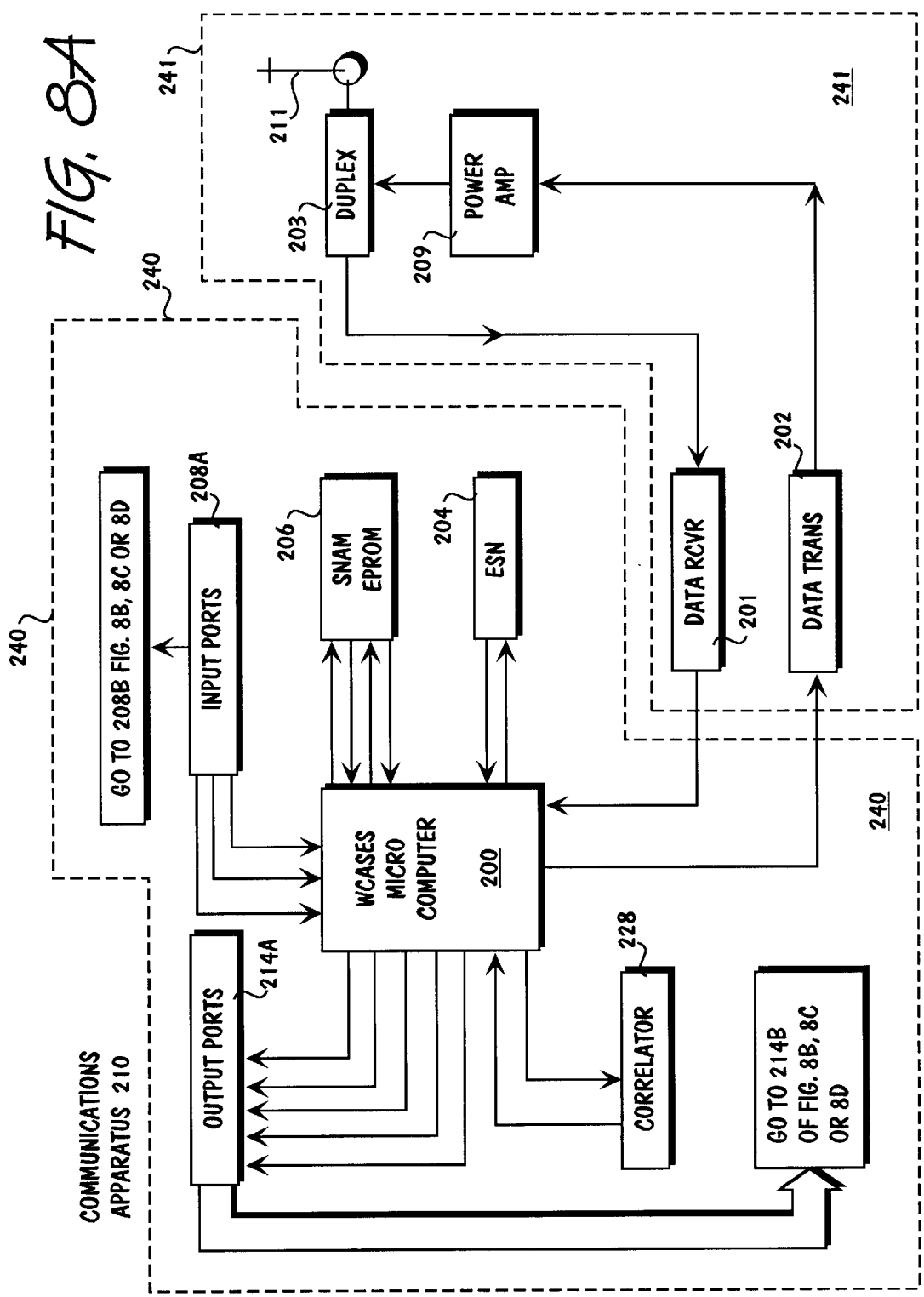
FIG. 8A is a logic flow chart of an Application Specific Integrated Circuit and Radio Frequency Circuit comprising the Communications Apparatus, according to the invention.

A stationary unit electrical load control apparatus is depicted in FIG. 8A and FIG. 8, which illustrate a preferred configuration and operation methodology. The load control device can be instructed to turn off or turn on and report its on or off status. In FIG. 1A the application specific service terminal for Utility Management (UM) 119C receives status reports from a Stationary Unit 107A or 107B which is configured for electrical load control via a Home Transmission Tower 109A, or "foreign" transmission tower 109B. Further, application specific status data is relayed from the transmission tower to the Home System Base Station 106A or to a "foreign" system Base Station 106B, depending on the operation location of this load control device and communications apparatus. Subsequently, application specific status data transmitted from a stationary unit which is configured as a load control device is sent from the Base Station 106A or 106B to the Mobile Switching Center 104 or 105 as desired. Depending on whether the application specific stationary unit 107A or 107B is located within the operating area of a Cellular Mobile Telephone (CMT) network or an Enhanced Special Mobile Radio (ESMR) network or a Satellite/Cellular Hybrid (SCH) network, and if the network is the system that the stationary unit electrical load control device is subscribed too or registered too is a home system or a "foreign" network system. If the stationary unit electrical load control device is registered to the system it is operating within, then it will send its application specific status data to the Mobile Switching Center 104 which is the home system for the WCASES system and its Master Central Monitoring Station (MCMS) 100. The home MSC 104 is connected directly to the Master Central Monitoring Center 100 and the stationary unit is preferably configured as an electrical load control apparatus which is controlled and monitored by application specific monitoring station 101 located within the same operation area of the Mobile Switching Center which is connected directly to the MCMS 100 which controls and manages a Cellular Mobile Telephone (CMT), Enhanced Mobile Radio (ESMR) or a Satellite/Cellular Hybrid (SCH) system for that given Geographical Service Area (GSA). Such stationary unit is then operating within the WCASES Home System. If the stationary unit electrical load control device is operating within another Cellular Mobile Telephone (CMT), Enhanced Mobile Radio (ESMR) or a Satellite/Cellular Hybrid (SCH) system which is not directly connected to the Master Central Monitoring Station (MCMS) 100, then the Stationary Unit electrical load control device is deemed a 'visiting roamer' by the 'foreign' operating system. If an Application Specific Central Monitoring Station 101 is located and operating in this 'foreign' network area it still receives application specific status data reports from the Master Central Monitoring Station (MCMS) 100 in the following manner. First of all the Stationary Unit 107B which in the present example is configured as an electrical load control device transmits its application specific status data to the closest Transmission Tower 109B, the Transmission Tower relays the data to the Base-Station 106B, and the Base Station transmits the data to the 'foreign' Mobile Switching Center (MSC) 105. The 'foreign' Mobile Switching Center (MSC) 105 relays Control Channel Data, and Digital Traffic Channel data which contains data that is specified as 'Roamer' registration information or 'Roamer' user information from its Visiting Location Register (VLR) 117 located within the "foreign" Mobile Switching Center (MSC) 105. The Roamer information is relayed to the 'Home' Mobile Switching Center (MSC) 104 and the Roamer Data is verified at the Home Location Register (HLR) 118. During this transfer of control channel information and user information which is deemed 'Roamer' data, the Master Central Monitoring Station (MCMS) 100 'reads' all control channel data strings, and digital traffic channel data strings. The user data contained within is specifically read by the MCMS and determines which data belongs to application specific mobile units and stationary units and processes the data in the prescribed manner.

Preferably, when an application specific central monitoring station sends its command instructions to a stationary unit or mobile unit configured for a particular application specific task, the application specific terminal, in this example, the Utility Management (UM) terminal 119C, sends a command to 'report status'. This application specific command message is preferably sent to fiber optic or hard-wired conductors represented by the Data Send Digital Pathway 132 located within the application specific monitoring station 101. The Data Send Digital Pathway 132 acts as a conduit for the 'report status' command data, which is relayed to the Application Specific Command & Dispatch Terminal 116. Terminal 116 is preferably directly connected to an Integrated Services Digital Network interface (ISDN) 112C. This 'report status' command data or message is sent from the dispatch terminal to the Public Switched Telephone Network (PSTN) 111. If the stationary unit 107B, which is preferably configured as a load control device, is located in a 'foreign' Mobile Cellular Telephone (CMT), or Enhanced Specialized Mobile Radio (ESMR) operations area, 'report states' command data is preferably sent to the 'foreign' Mobile Switching Center (MSC) 105 via ISDN interface 112C, the Public Switched Telephone Network (PSTN) 111, and ISDN interface 112B. This 'report status' command data is sent to the closest 'foreign' Transmission Tower 109B and base station 106B, and transmitted to stationary unit 107B preferably configured as an electrical load control apparatus. This stationary unit 107B immediately responds to the 'report status' command or messages and sends the 'status' of the stationary unit in the form of control channel or digital traffic channel bits to the nearest Transmission Tower 109B, and relayed to the base station 106B, which recognizes this 'status data' as normal control channel and digital traffic channel information. This data message is recognized as manipulated, encrypted, and translated data, which in a normal voice call is recognized as Mobile Identification Numbers (MIN), Shared Secret Data (SSD), A-Key Data, digital traffic channel User Data, control channel and digital traffic channel Filler Data, Reserved Format data, and the like, which was originally intended to enable only certain types of internal system procedures such as anti-fraud processes, voice encryption, registration, billing, intersystem communications, roaming procedures, text messages and other related processes. This data is relayed from the base station 106B to the 'foreign' Mobile Switching Center (MSC) 105 over signalling pathways via an ISDN interface 112B to the Public Switched Digital Network (PSTN) 111 and to the Home System Mobile Switching Center (MSC) 104. The Master Central Monitoring Station (MCMS) 100 retrieves and processes this data in the aforementioned manner and relays this data the Application Specific Central Monitoring Station (ASCMS) 101 via ISDN interfaces and the Public Switched Telephone Network (PSTN).

Preferably, the signalling formats and protocols or SS7, X.25, ISDN, and the like, are line-of-sight microwave geosynschronous satellite signalling pathways and or equivalents. The 'status data' is processed at the Application Specific Central Monitoring Station (ASCMS) 101 and a response is made depending on the particular stationary unit status condition. As seen in FIG. 1B, a region to region communication system is illustrated. As in FIG. 1A the method and apparatus operates essentially in the same manner, however, there are some differences in these embodiments. FIG. 1B depicts three different satellite systems that operate differently than one another, Global Positioning Satellites 110A and 110B serve the functions of providing land based positioning coordinates to the Mobile Units 108A and 108B, and their communications apparatus which contain internally integrated global positioning receivers. A geosynschronous satellite 341 provides a communications pathway between the Master Central Monitoring Station (100) and the Application Specific Central Monitoring Station (ASCMS) 101. Satellite 341 contains a plurality of circuits, software, microprocessors, and other means well known in the art, that receive and transmit Cellular Mobile Telephone (CMT) data and voice, Enhanced Specialized Mobile Radio (ESMR), and Global Specialized Mobile (GSM) data and voice signals independent of other system functions thus described. Geosynchronous Satellite 341 transmits and receives Cellular Mobile Telephone (CMT), Enhanced Specialized Mobile Radio (ESMR) control channel, digital traffic channel, T1, and T2 carrier signals, SS7, X.25 and other signalling protocols which manage and control roaming information and other user specific data and messages. The 'Brilliant Pebbles' satellites, generically called Low Earth Orbit (LEO) satellites, 356A, 356B, 356C and 356D, preferably rotate around the Earth in a synchronized web like pattern and provide the method and means of transmitting and receiving Cellular Mobile Telephone (CMT), Enhanced Specialized Mobile Radio (ESMR), Personal Communications Systems (PCS) voice and data signals. The method and apparatus of the present invention utilizes the same methodology with these satellite systems. That is, the ability to create a manipulated data, manipulate, translate, and encrypt control channel and digital traffic channel data, and send and receive Application Specific Data to and from Stationary Units 107A, 107B and Mobile Units 108A and 108B, thereby utilizing these different satellite systems in the same manner as has been described for Cellular Mobile Telephone (CMT) and Enhanced Specialized Mobile Radio (ESMR) and related systems.

In reference to FIG. 1B satellite ground stations 357A and 357B, preferably communicate directly with the Master Central Monitoring Station (MCMS) 100 and the Application Specific Central Monitoring Station (ASCMS) 101, by providing communications pathways for Application Specific Data (ASD) being sent to the Master Central Monitoring Station (MCMS) 100 from these satellite systems. The satellite systems preferably directly receive and transmit data to Stationary Units 107A and 107B and Mobile Units 108A and 108B configured to transmit and receive satellite signals. These same satellite systems provide communications pathways to the Ground Stations 357A and 357B, and these stations relay this application specific data to Application Specific Central Monitoring Stations (ASCMS) 101 and the Master Central Monitoring Stations (MCMS) 100. Additionally, these satellite systems also carry terrestrial Cellular Mobile Telephone (CMT), Enhanced Specialized Mobile Radio (ESMR), control channel data, roamer data, and digital traffic channel data in the form of synchronous T1, T2, SS7, X.25 carrier frequencies, data and carrier wave management protocols.

Figure 8B:
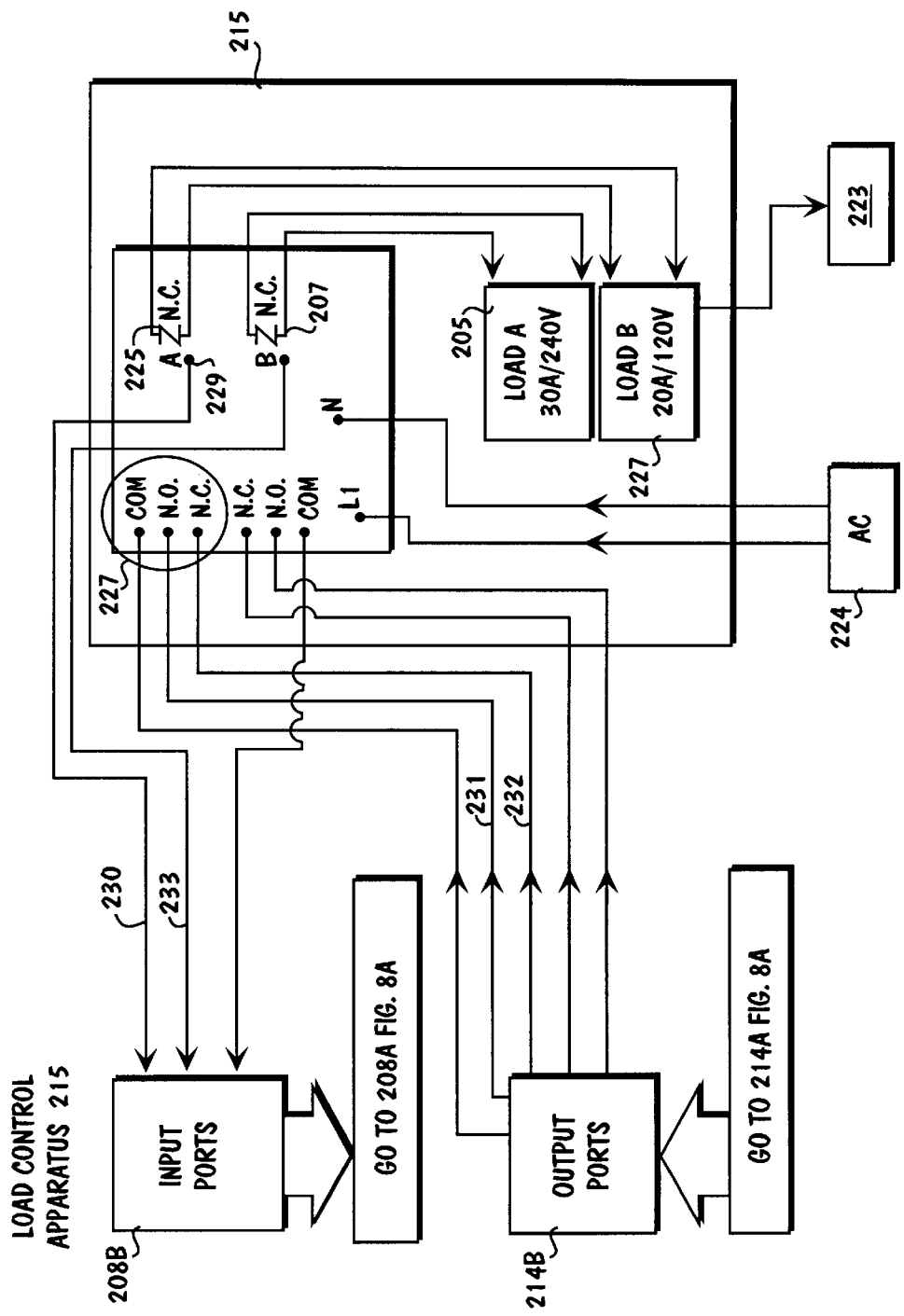
FIG. 8B is a logic flow chart of an Application Specific Load Control Apparatus, according to the invention.

In FIGS. 8A and 8B a Communications Apparatus 210 can be operably connected to an electrical load control apparatus 215. A principal part of this apparatus is an Application Specific Integrated Circuit (ASIC) 240 that comprises a plurality of microchips and include the WCASES Microcomputer 200. This microcomputer controls the Data Receiver 201 and the Data Transceiver 202, which are components of the Radio Frequency Circuit 241. Data is transmitted to the Stationary Unit from a nearby transmission tower and base station, which is first received by the Radio Frequency Circuit 241 unit Antenna 211 located on or near the Stationary Unit, the data signal passes through the antenna and through the Duplex Combiner 203 that combines the frequencies of data received by the unit and data transmitted by the Stationary Unit. In typical Cellular Mobile Telephone (CMT) and Enhanced Specialized Mobile Radio (ESMR) communication systems, communications occur in a full duplex mode, that is voice and data signals are transmitted from communicators on separate channels and frequencies. Voice and data signals that are received by communicators are sent on separate channels and frequencies, and these actions occur simultaneously during full duplex talk and listen mode, as well as full duplex data send and receive. In FIG. 8A, it is seen that the Duplex Combiner 203 allows full duplex simultaneous communication data received by the Data Receiver 201 and sent by the Data Transmitter 202. The Microcomputer 200 also is utilized to control the functions of the specialized SNAM EPROM 206. SNAM is an acronym which stands for Specialized Number Assignment Module (SNAM). The SNAM is an EPROM micro chip that contains stored Mobile Identification Numbers (MIN), Shared Secret Data (SSD), A-Key Data, and other related control channel and digital traffic channel data that can be used for reserved formats, filler data and other related data spaces normally used for non-application specific purposes. In addition the SNAM contains additional data, and user data used for application specific communications on control channels and digital traffic channels. The ESN Module 204 stores the 32 bit 7 character number that represents the Electronic Serial Number (ESN). The ESN is a permanently stored number that uniquely identifies this particular Stationary Unit in the previously described manner.

Referring to FIG. 8A the Correlator 228 is also controlled by microcomputer 200 and acts as a data collector. Data is route to correlator 228 by microcomputer 200 form application specific devices interfaced to input ports 208A. Correlator 228 is preferably a microcompressor and functions as a collector of data directly derived form the application specific apparatus 210 interfaced with input ports 208A. Microcompressor 200 preferably sends this collected data to the SNAM EPROM 206. Preferably, when the stationary unit transmits data on a control or digital traffic channel, microprocessor 200 instructs data transmitter 202 to lock on the strongest channel. Microcomputer 200 instructs SNAM EPROM 206 to send data to data transceiver 202 while simultaneously, microcomputer 200 instructs correlator 228 to send the data it has collected to SNAMEPROM 206. Accumulated data is then preferably sent to the nearest CMT network of ESMR network of SCH network, and the network relays this data to the MCMS in the aforementioned manner.

As shown in FIG. 1A, when ASCM 101 sends data to stationary unit 107A, 107B or a mobile unit 108A or 108B, the MCMS 100 relays this data to the MSC 104, and the MSC determine the system location of the stationary or mobile unit, and then sends these instructions to the respective unit. Best seen in FIG. 8A, the preferred method and apparatus utilizes communications apparatus 210 which is a standardized WCASES system, thereby allowing for a tremendous amount of diverse application specific systems and apparatuses to be interfaced with communications apparatus 210.

In FIGS. 8B, 8C, and 8D three different application specific apparatuses are shown that perform separate and distinct functions. However, the present invention is not limited to being interfaced with only three application specific apparatuses. In fact, a wide variety of application specific devices may be interfaced, performing an almost limitless number of status data gather task, from a wide variety of sensor types and systems that take measurements electronically, and derive electronic digital data status from such measurements.

In reference to FIG. 8A communications apparatus 210 includes input ports 208A and output ports 214A. These ports can be configured to accept RS232 devices, DIN PIN 9 pin in interfaces, RS422 serial and parallel inputs, and any other format of interface plug.

In reference to FIGS. 8B, 8C, and 8D, all apparatus shown contain input ports 208B and output ports 214B. Input ports 208B are interfaceable with input ports 208A of communications apparatus 210 as are output ports 214B. In FIG. 8B, in one example of an application specific application, stationary unit load control device 215 is interfaced with communications apparatus 210, input port 208A, and output port 214A is operably connected to output port 214B of FIG. 8B. Stationary unit load control device 210 may be used to control and monitor any sort of 120 volt AC device or any 220 volt AC device, for example, swimming pool motors, street lights, air conditioning systems, and the like.

Another example of the operation and use of the method and apparatus of the present invention is seen in FIG. 8B, where load control apparatus 215 controls electrical appliance 223 connect to load port B 227, which provides 120V AC rated at 20 Amps. The 120V 20 amp relay 225 is shown closed providing a complete circuit whereby appliance 223 is turned on and fully powered. Input port conductor 230 is preferably connected to load control sensor circuit 229 which send bit data indicating that the 'circuit is powered' to Microcomputer 200 as shown in FIG. 8A. Microcomputer 200 sends status bits to correlator 228.

In FIG. 1A, when ASCMS 101 send command dat instructing stationary unit 107A to 'transmit status data', this action preferably occurs over forward control channels and forward digital traffic channels, depending upon what type of system the stationary unit is operating in. Best seen in FIG. 11, command data bit maps 228 are preferably transmitted over control channels and digital traffic channels within the CMT, ESMR and SCH networks. Bit map 438 illustrates command data messages sent to a communications apparatus over the forward digital traffic channel from the ASCMS 101 to the MCMS 101, to the MSC 100, to the base station 106A and transmission tower 109A, and to the stationary unit 107A and it communication apparatus, via ISDN 112A, 112B, 112C, and PSTN 111 networks. All of the bit maps shown 438, 441, and 443 are bit map formats operating on analog and digital cellular telephone systems, enhanced specialized mobile radio systems such as NEXTELL, and related systems forward analog and digital control channels and forward digital traffic channels. Bit map 438 illustrates a command data string sent over the forward digital traffic channel of a digital cellular telephone system, and/or enhanced specialized mobile radio system. Such bit map can also be used in a global specialized mobile system as well. Bit map 438 shows letters 'A through G' and bracketed sets of numbers of command words. Each letter represents a command or instruction sent from the application specific central monitoring station. Application specific data meanings 442 show what each letter represent on the bit map and the other two illustrated bit maps. These bit maps show various types of command data sent to different types of stationary units and mobile units on their respective communications apparatus. In practice, the only command words or messages that are sent to a particular unit are the words or messages that relate to that particular application specific apparatus configuration and particular function. For example, bit map 438 shows various command words or messages that cause certain responses from the application specific apparatus controlled by the communications apparatus. Application specific command data meanings 422 shown that the 'A word' on bit map 438 commands an electrical load control unit to 'turn off'. The 'B word' commands this same unit to respond with status. In this case, status data indicates that the unit is turned off because of the action taken by the communications apparatus as a response to the 'A word' that preceded the 'B word' as a command.

In FIGS. 8A and 8B, the communications apparatus 210 receives the 'A word' command to turn off, data receiver 201 receives the bit stream which contains the 'A word' through antenna 211 and duplex combiner 203. The data receiver 201 then sends this command data to microcomputer 200. Microcomputer 200 determines that this command data contains the 'A word' and sends data bits to output port conductor 231 which is connected to the input N.O. point of the control module 227 for the 120 v 20 amp relay controlling he 20 v 20 amp appliance 223, which in turn opens this relay thereby cutting its power source. Immediately, because communications apparatus 210 received the 'B word' it transmits a bit stream which contains data that signals the application specific utility management terminal its 'poser off' status. In FIG. 8B Load A 205 is not used nor is Load A Relay 207. However, in a different application, Load A and Load A Relay can be fully functioning and the input conductor 233 functions in a similar manner as input conductor 230 thereby detecting whether Load B Relay is open or closed, or powered or non-powered. The Ac poser supply 224 that powered the load control apparatus 215 can either be 120 volt AC or 240 volt AC, depending on the power requirements of the appliance or system it is managing.

Referring now to FIG. 8C, a global positioning system receiver is shown and the interface with communications apparatus 210 via input and output ports, thereby allowing data bits to flow back and forth between the two apparatus as shown in FIG. 8A. Together, FIGS. 8A and 8B illustrate a compete mobile unit, configured for example, for locating, tracking, and protecting a motor vehicle as used in automobile tracking and anti-theft applications. Of course, this combined mobile unit may also be used for a wide variety or other applications such as fleet management of motor vehicles, including trucks, taxis, ambulances, police vehicles, and other public and private fleet vehicles. For example, Auto Security System 315 detects a vehicle intrusion which is indicated by an open contact closure 316 which is preferably fitted to a vehicle door, trunk lid, or hood. Auto Security System 315 having detected an intrusion send alarm data and status information to Communications Apparatus 210 via an Input Port conductor 317 and to Microcomputer 200 which instructs the integrated circuits to send manipulated and translated data through the Radio Frequency Circuit 241 and on through the Wireless Network and to the central monitoring stations in the aforementioned manner, whereby the Master Central Monitoring Station (MCMS) and the Application Specific Central Monitoring Station (ASCMS) receives, processes, and responds to the manipulated and the translated data in relation to its status.

Another example of the operation of Communications Apparatus 210 is when Communications Apparatus 210 receives command instructions from the central monitoring stations to send location status. The Radio Frequency Circuit 241 receives command instructions via the unit Antenna 211, Duplex Combiner 203, Data Receiver 201, and then relays this data to the Application Specific Integrated Circuit (ASIC) 240. Microcomputer 200 transmits instructions to Location Apparatus 216 via Output Port conductors 231, 232, and to the GPS Microcomputer 303 so as to forward location coordinates to Input Port conductors 230, 233 and to the Correlator 228, the Data Transmitter 202, the Power Amp 209, Antenna 211, and into the wireless network in the aforementioned manner.

In reference to FIG. 8D, Game Unit 217 is preferably directly interfaced to Communications Apparatus 210 depicted in FIG. 8A, via Input Ports 208A, 208B, and Output Ports 214A and 214B. Referring to FIGS. 8A and 8D Communications Apparatus 210 and Game Unit 217 are communicativley joined as one Integrated Video Game Communications Unit 103. Game Unit 217 represent a generic game caddy which could be any home or arcade video game playing apparatus. Of course, such could be downloaded and connected to Game Unit 217.

Figure 9:
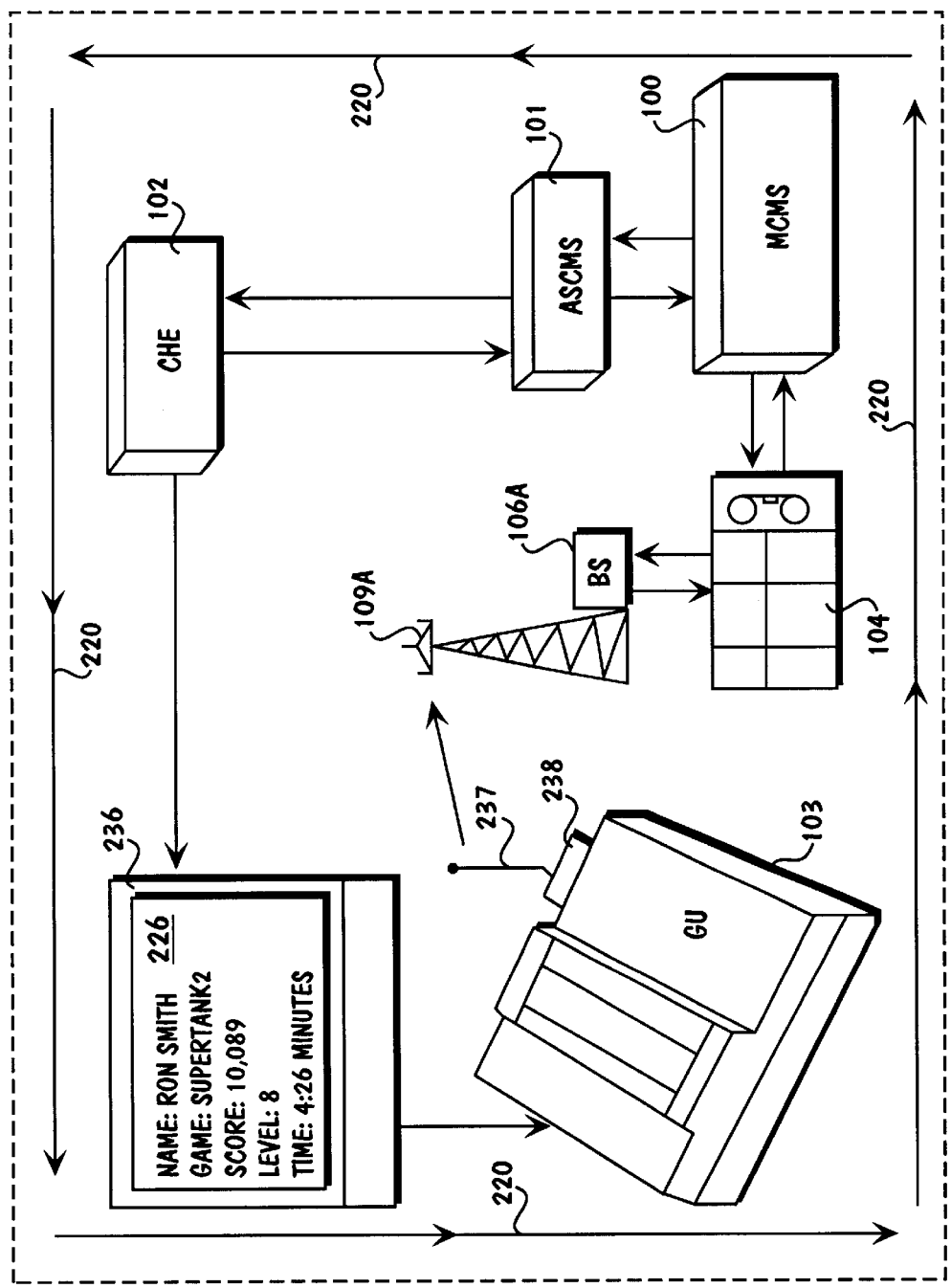
FIG. 9 is a flow chart of the Application Specific Video Game Unit score and status data as it circulates through a wireless communication system and a cable television system, according to the invention.

Referring now to FIG. 8A and FIG. 8D, Integrated Video Game Communications Unit (IVGCU) 103 preferably includes video game firmware or Software Module 218 integrated with Communications Apparatus 210 via Input Port 208A, 208B, conductors 230, 233, and Output Port 214A, 214B, conductors 231 and 232. Seen in FIGS, 8A, 8B, and 9, the method and apparatus of the present invention provides a very efficient and inexpensive means and method to provide video game scores, levels of play, duration of play, particular game identification, and other data which is manipulated, translated, and transmitted to the Video Game Cable Channel Head End 102 in the same manner as that described for the other Application Specific Apparatus and Communication Apparatus systems. The IVGUC 103 preferably transmits gaming data into the wireless network in the aforementioned manner, and the Cable Head End 102 functions as an Applications Specific Dispatch Center that in turn broadcasts said gaming scores and other data to the users. A television set or monitor 236 illustrates the game score and player status 226, however, a cable television video game channel may transmit game score and player status for video game players from different parts of the country simultaneously. Best seen in FIG. 9 the Cable Head End 102 operably receives Application Specific Data and translates this data back to alpha numeric text as seen on television monitor 236 and then broadcasts it in the manner described above.

Figure 10A:
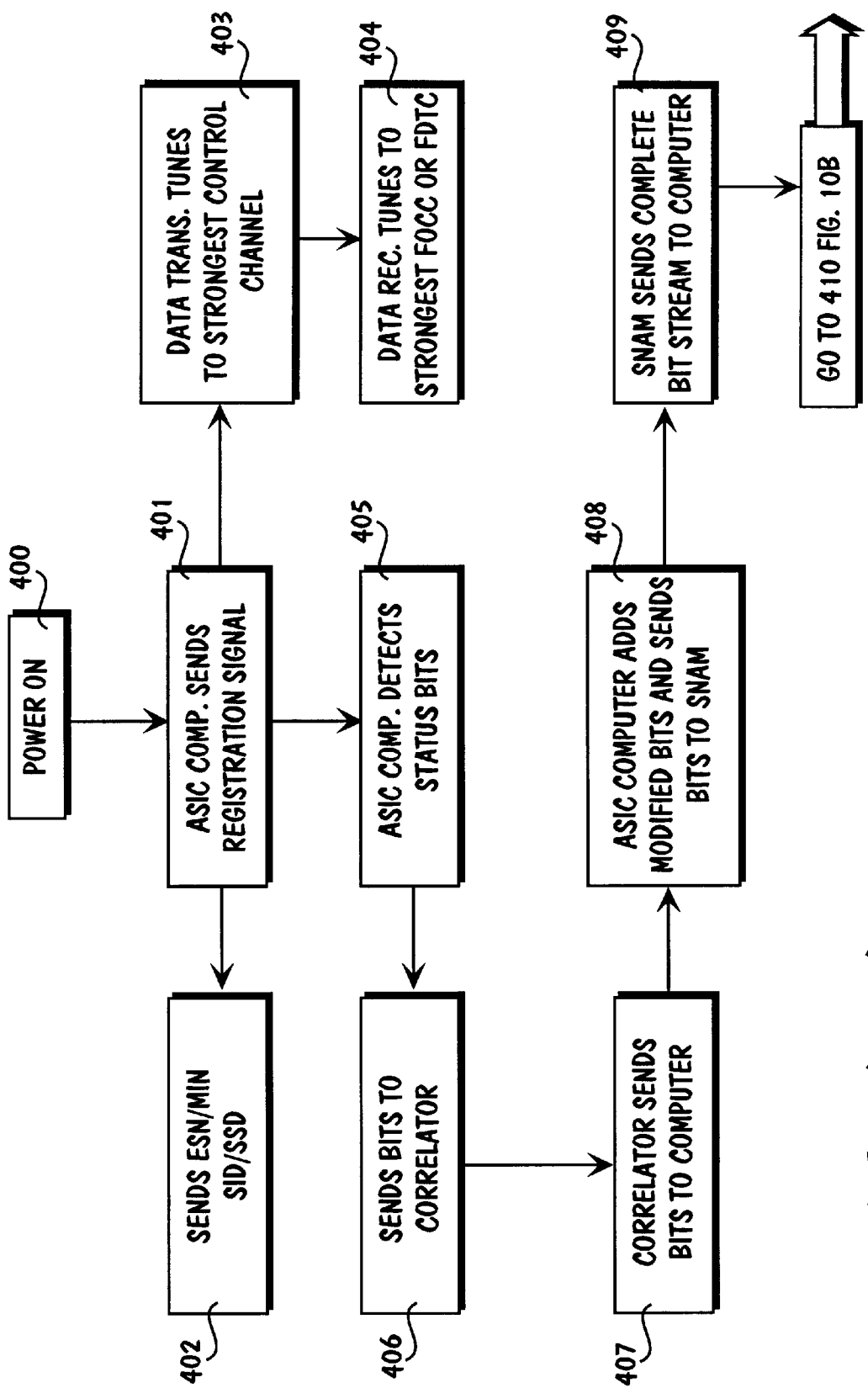
FIG. 10A is a block diagram of a wireless network control channel activity while the present invention is initiating an operations cycle within a routine control channel, according to the invention.
Figure 10B:
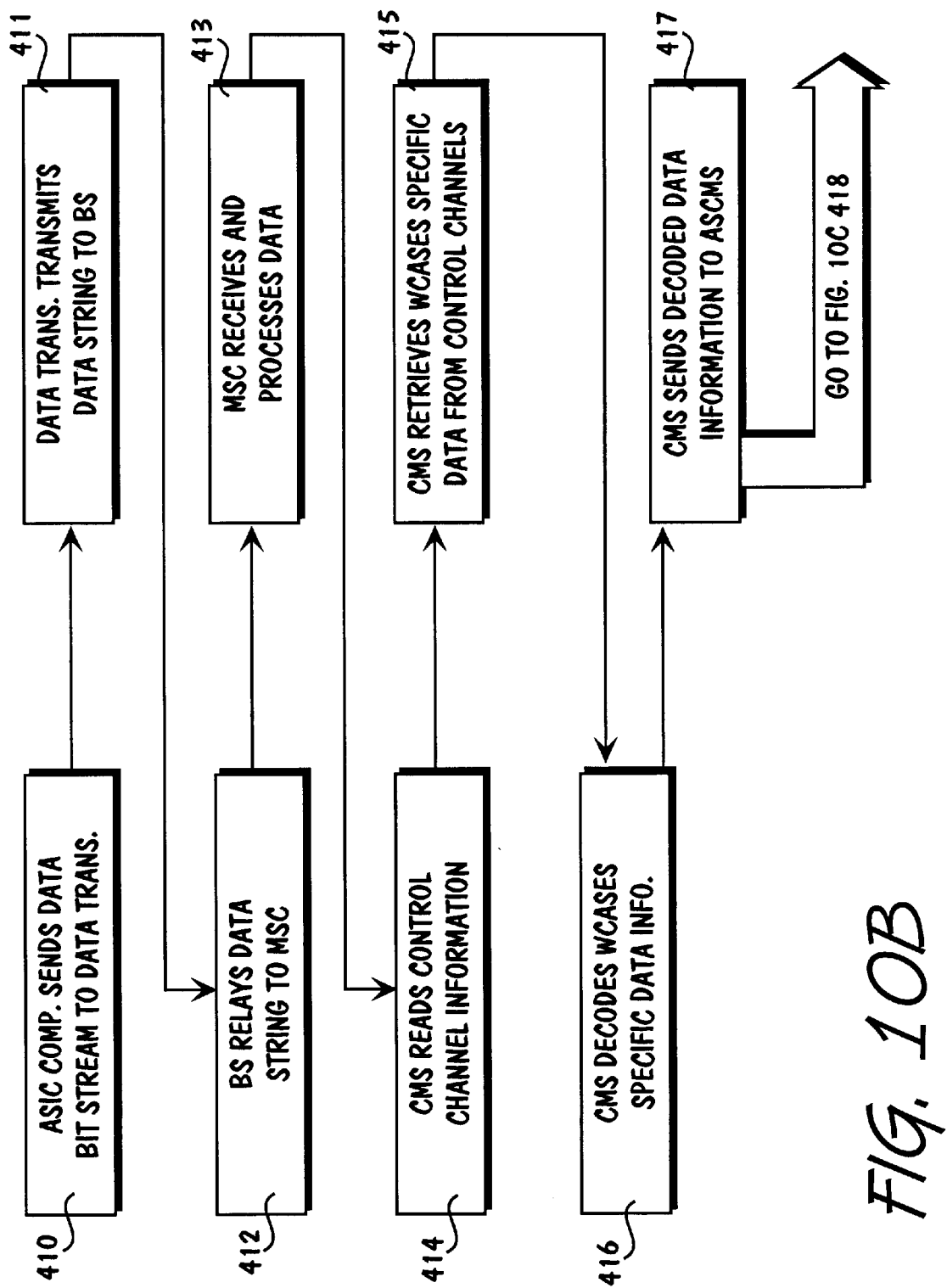
FIG. 10B is a block diagram of a wireless network control channel activity while the present invention is continuing the operations cycle within the routine control channels, according to the invention.
Figure 10C:
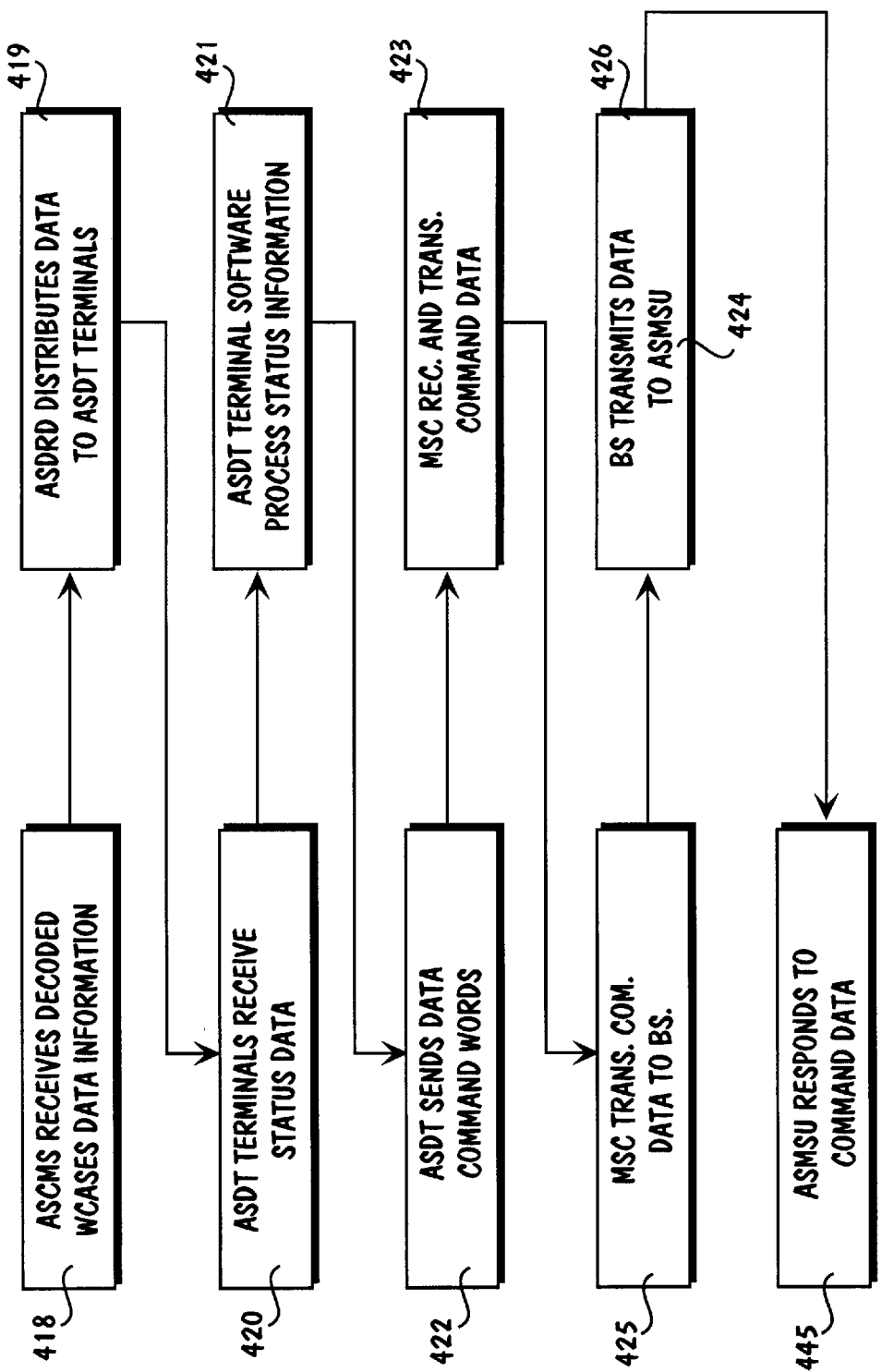
FIG. 10C is a block diagram of a wireless network control channel activity while the present invention is concluding an operations cycle within said routine control channels, according to the invention.

In FIGS. 10A, 10B, and 10C flow charts illustration the method of control data processing are shown according to a preferred embodiment of the invention. Steps 400 through 445 show a typical operations routine in a wireless network, including the method of the present invention. It is seen that when a Mobile Stationary Unit is activated, the Power On 400 sequence preferably initializes the ASIC circuits (computer) 401 to initialize a registration routine that in turn causes the ESN/MIN/SID 402 and other data to be transmitted. The ASIC circuits then cause the Data Transceiver to tune to the strongest paging, forward control channel, or forward digital traffic channel 404, simultaneously the ASIC computer detects status bits 405 and send these bits to Correlator 406. Correlator 406 send bits to ASIC computer 407 which adds modified bits tot he over all synchronous bit stream and sends these bits to SNAM 408. SNAM send bits to ASIC computer 409 and ASIC computer 409 send a data bit stream to data transceiver 410. Subsequently, the data transceiver send the bit stream to the mobile switching center (MSC) 412. MSC 412 receives and processes the control channel and digital data 414 data at the MCMS. MCMS preferably retrieves WCASES specific data bit streams from control channels and digital traffic channels 415. MCMS decodes WCASES specific data 416 and send decoded data to ASCMS or to the Video Game Channel Cable Head End (GCCH) 417.

The ASCMS receives decoded data 418 and the Application Specific Data Reception and Distribution Terminal (ASDRD) distributes such data to Application Specific Data Terminals (ASDT), which can also be located at GCCH 419, if desired. The ASDT receives status information data 420 and the ASDT software processes status data 421 to determine status. Then the ASDT transmits data command words to the MSC 422 which receives and transmits command data words on the forward control channels or forward digital traffic channels 423 for determination with the ASM or stationary unit and then transmits command data to the base station and transmission tower closes to the ASM or stationary unit 425. The base station then preferably transmits command bit stream data 426 to AM or the stationary unit, and the ASM or stationary unit then respond to command data 455. During response procedure, the method begins all over again as shown in FIG. 10A, for the ASIC responds to command data in the same manner as its operations sequences during a power up and registration sequence as shown. Preferably the power on sequence 400 is not repeated, however, specification 401 through 421 are repeated, the process halts here if no command data need to be sent to the ASM or stationary unit. If command data needs to be sent as a result of the ASCMS determining its status, then operations specification 401 through 455 are completed.

In FIG. 11 a Command Data Bitmap is shown, illustrating forward control channel and forward digital traffic channel command data words and the data bit streams which carry the Command Data words. Command Data words for the digital traffic channel 438 are decoded 442 preferably in the form of words A through. Overhead or forward control channel Command Data words are preferably expressed in the form 441. Additionally, reserved format and/or Additional Data 433 is manipulated and translated and the meanings are expressed by decoding the 'H word', in the Application Specific Command data Meaning box 442. Such examples of Command Data words being sent on forward control channels and forward digital traffic channels cause the previously discussed actions for the ASM or Stationary Unit and the internal communications apparatus and subsequently controlled Application Specific Apparatus.

Figure 12:
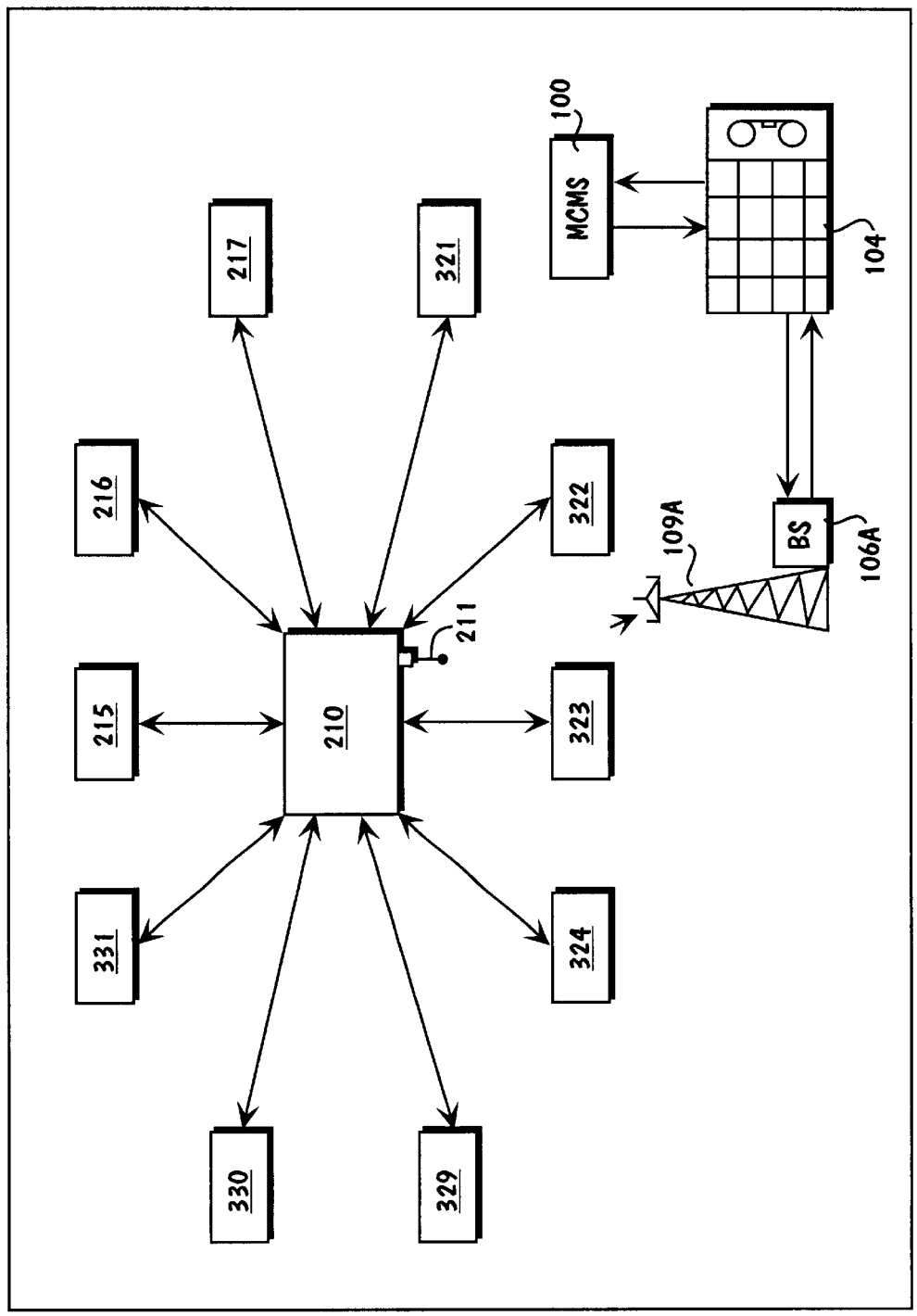
FIG. 12 is a block diagram of a preferred interaction of the Communications Apparatus with various Application Specific Apparatuses, according to the invention.

Referring now to FIG. 12, it is seen how the Communications Apparatus 210 can be operably coupled to an almost unlimited number of application specific devices. Status and command data can be sent and received in a uniform and transparent manner in existing wireless networks, without disruption of the network or overloading of the network, and without requiring infrastructure upgrades, with only some software modification requirements at an existing MSC and the internal processing systems.

Additional advantages and modifications will readily occur to those skilled in the art. The invention in its broader aspects is, therefore, not limited to the specific details, representative methods and apparatus, and illustrative examples shown and described. For example, the application specific uses are nearly endless, such as home security monitoring; security system remote control panels; child protection; remote drug or alcohol monitoring by placement of a micro sensing chip on a user for transmission to the communicator apparatus which can transmit such data into a wireless network; environmental sensors for monitoring various environmental parameters such as pollution, snowfall, wind speed or the like; protection and monitoring the aged or infirm, where the communicator is interfaced to a non-removable wrist band or leg band that contains a separate transmitter that transmits coded data to the communicator apparatus for detection of a signal from the wrist band; home arrest applications, and any other application that requires location, identification, and status information. Accordingly, departures may be made from such details disclosed herein without departing from the spirit or scope of the applicant's general inventive concept.

What is claimed is:

1. A method for communicating messages from a communicator over a cellular telephone network that includes a voice channel and a control channel wherein the voice channel conveys data and the control channel conveys control signals that manage access to and use of the voice channel, the method comprising:

a) encoding at the communicator a message comprising data related to a specific application to create an encoded message for transmission over the control channel as control signals, comprising retrieving from a memory of the communicator one of a plurality of alternative Mobile Identification Numbers (MINs) in which one of a plurality of alternative messages is encoded; and b) transmitting the encoded message from the communicator over the control channel as control signals, bypassing the voice channel.

2. The method of claim 1, further comprising an initial step of transmitting the message comprising data related to a specific application from a remote monitoring device to the communicator.

3. The method of claim 2, wherein the remote monitoring device comprises an alarm system, and transmitting the message comprising data related to a specific application from the remote monitoring device to the communicator comprises transmitting the message comprising data related to a status of the alarm system from the alarm system to the communicator.

4. The method of claim 2, wherein the remote monitoring device comprises a tracking system, and transmitting the message comprising data related to a specific application from the remote monitoring device to the communicator comprises transmitting the message comprising tracking data from the tracking system to the communicator.

5. The method of claim 2, further comprising:

receiving at a central monitoring station the encoded message transmitted from the communicator over the control channel; and decoding the encoded message to extract the message transmitted by the remote monitoring device.

6. The method of claim 1, wherein decoding the encoded message to extract the message transmitted by the remote monitoring device comprises decoding the retrieved one of a plurality of alternative Mobile Identification Numbers (MINs) in which one of a plurality of alternative messages is encoded to extract the message.

7. The method of claim 2, wherein the remote monitoring device comprises a public utility meter, and transmitting the message comprising data related to a specific application from the remote monitoring device to the communicator comprises transmitting the message comprising data related to public utility usage information from the public utility meter to the communicator.

8. In a wireless data communications network that includes a voice channel for transmitting voice data and a control channel for transmitting control data that controls access to and use of the voice channel, a method for transmitting messages from a central monitoring station to a remote device coupled to a communicator, over the control channel of the wireless data communications network, comprising:

a) encoding at the central monitoring station a message comprising data related to a specific application to create an encoded message for transmission over the control channel as control signals to the communicator, comprising retrieving from a memory accessible by the central monitoring station one of a plurality of alternative Mobile Identification Numbers (MINs) in which one of a plurality of alternative messages is encoded; and b) transmitting the encoded message from the central monitoring station over the control channel as control signals, bypassing the voice channel, to the communicator.

9. The method of claim 8, wherein the control channel for transmitting control data that controls access to and use of the voice channel includes a digital traffic channel and transmitting the encoded message from the central monitoring station over the control channel as control signals, bypassing the voice channel, to the communicator comprises transmitting the encoded message from the central monitoring station over the digital traffic channel as control signals, bypassing the voice channel, to the communicator.

10. the method of claim 9, further comprising the initial step of transmitting the message comprising data related to a specific application from an application specific central monitoring system to the central monitoring station.

11. The method of claim 10, wherein transmitting the message comprising data related to a specific application from an application specific central monitoring station to the central monitoring station comprises transmitting the message comprising data related to a request for status of a remote alarm system from a security system central monitoring station to the central monitoring station.

12. The method of claim 10, wherein transmitting the message comprising data related to a specific application from an application specific central monitoring station to the central monitoring station comprises transmitting the message comprising data related to a request for a location of a remote object from a tracking system central monitoring station to the central monitoring station.

13. The method of claim 10, wherein transmitting the message comprising data related to a specific application from an application specific central monitoring station to the central monitoring station comprises transmitting the message comprising data related to a request to read a public utility meter from a public utility central monitoring station to the central monitoring station.

14. The method of claim 8, further comprising:
   a) receiving at the communicator the encoded message transmitted from the central monitoring system over the control channel as control signals;
   b) decoding at the communicator the encoded message to extract the message.

15. The method of claim 14, wherein decoding at the communicator the encoded message to extract the message comprises searching for the one of the plurality of alternative MINs comprising the encoded message in a table of Mobile Identification Numbers (MINs) in a memory of the communicator.

16. The method of claim 15, wherein if the one of the plurality of alternative MINs comprising the encoded message is in the table of Mobile Identification Numbers (MINs) in the memory of the communicator, transmitting the message from the communicator to the remote device.

17. A communicator for communicating messages to a central monitoring station over a cellular telephone network that includes a voice channel and a control channel wherein the voice channel conveys data and the control channel conveys control signals that manage access to and use of the voice channel, the communicator comprising:
   an interface coupled to a remote data source to receive a message from the remote data source, the message comprising information related to a specific application; and
   a logic circuit coupled to the interface that encodes the message received from the remote data source to create an encoded message for transmission to the central monitoring station over the control channel as control signals, wherein the logic circuit retrieves from a memory of the communicator one of a plurality of alternative Mobile Identification Numbers (MINs) in which one of a plurality of alternative messages is encoded, and
   a transmitter coupled to the logic circuit that transmits the encoded message to the central monitoring station over the control channel as control signals, bypassing the voice channel.

18. The communicator of claim 17, wherein the communicator is mobile.

* * * * *